United States Patent
Park et al.

(10) Patent No.: US 12,214,788 B2
(45) Date of Patent: Feb. 4, 2025

(54) APPARATUS AND METHOD FOR CONTROLLING AUTONOMOUS VEHICLE

(71) Applicant: Kookmin University Industry Academy Cooperation Foundation, Seoul (KR)

(72) Inventors: Ki Hong Park, Seoul (KR); Tae Young Oh, Daejeon (KR); Weon Il Son, Daegu (KR)

(73) Assignee: Kookmin University Industry Academy Cooperation Foundation, Seoul (KR)

(*) Notice: Subject to any disclaimer, the term of this patent is extended or adjusted under 35 U.S.C. 154(b) by 341 days.

(21) Appl. No.: 17/540,078

(22) Filed: Dec. 1, 2021

(65) Prior Publication Data
US 2023/0031030 A1    Feb. 2, 2023

(30) Foreign Application Priority Data

Jul. 23, 2021 (KR) .................. 10-2021-0097125
Sep. 14, 2021 (KR) .................. 10-2021-0122337

(51) Int. Cl.
*B60W 30/16* (2020.01)
*B60W 30/18* (2012.01)
(Continued)

(52) U.S. Cl.
CPC ...... *B60W 30/16* (2013.01); *B60W 30/18163* (2013.01); *B60W 50/0098* (2013.01);
(Continued)

(58) Field of Classification Search
CPC .......... B60W 30/16; B60W 30/18163; B60W 50/0098; B60W 60/0015;
(Continued)

(56) References Cited

U.S. PATENT DOCUMENTS 11,738,742 B2 * 8/2023 Komuro .............. B60W 30/143
                                                     701/26
2019/0004529 A1 * 1/2019 Im ........................ G05D 1/0223
(Continued)

FOREIGN PATENT DOCUMENTS

JP       20099078735 A    4/2009
JP       2013107431 A     6/2013
(Continued)

OTHER PUBLICATIONS

Im Seong Su, Dec. 14, 2015, English Machine Translation_KR20170070580A provided by Patent Translate by EPO and Google (Year: 2017).*
(Continued)

*Primary Examiner* — Ashley L Redhead, Jr.
(74) *Attorney, Agent, or Firm* — Berkeley Law & Technology Group, LLP

(57) ABSTRACT

An apparatus for controlling an autonomous vehicle disclosure may include a processor and a memory configured to be operatively connected to the processor and to store at least one code performed in the processor, wherein the memory may store a code that, when executed by the processor, causes the processor to control the autonomous vehicle to travel on the basis of a distance from a preceding vehicle in a travel lane in which the autonomous vehicle travels or a preset speed, determine a risk level of a lane change on the basis of a speed of the autonomous vehicle, a speed of a side vehicle traveling in a target lane of a lane change, and a distance between the autonomous vehicle and the side
(Continued)

vehicle upon occurrence of a lane change request, and perform longitudinal or lateral control for the lane change on the basis of the risk level.

11 Claims, 15 Drawing Sheets

(51) Int. Cl.
*B60W 50/00* (2006.01)
*B60W 60/00* (2020.01)

(52) U.S. Cl.
CPC . *B60W 60/0015* (2020.02); *B60W 2050/0022* (2013.01); *B60W 2520/10* (2013.01); *B60W 2520/105* (2013.01); *B60W 2552/10* (2020.02); *B60W 2554/4041* (2020.02); *B60W 2554/4042* (2020.02); *B60W 2554/802* (2020.02); *B60W 2554/804* (2020.02); *B60W 2720/10* (2013.01)

(58) Field of Classification Search
CPC ..... B60W 2050/0022; B60W 2520/10; B60W 2520/105; B60W 2552/10; B60W 2554/4041; B60W 2554/4042; B60W 2554/802; B60W 2554/804; B60W 2720/10; B60W 2720/106; B60W 2754/30; B60W 60/001

See application file for complete search history.

(56) References Cited

U.S. PATENT DOCUMENTS

| 2022/0348227 A1* | 11/2022 | Foster | G06V 40/10 |
| 2023/0031030 A1* | 2/2023 | Park | B60W 30/16 |

FOREIGN PATENT DOCUMENTS

| JP | 20180300479 A | | 3/2018 |
| KR | 101307109 B1 | | 9/2013 |
| KR | 20170070580 A | * | 12/2015 |
| KR | 1020180024414 A | | 3/2018 |
| KR | 1020180096114 A | | 8/2018 |
| WO | 2017022447 | | 2/2017 |

OTHER PUBLICATIONS

Office Action, Notice of Reason for Refusal, App. No. JP2021-192279, Date of Drafting Jan. 4, 2023, 6 pages.

Oh, et al, "Development of Automated Lane Change Algorithm Considering Safety of Surrounding Vehicles," Transactions of the Korean Society of Automotive Engineers, vol. 29, No. 5, May 1, 2021, 15 Pages.

* cited by examiner

[FIG. 1]
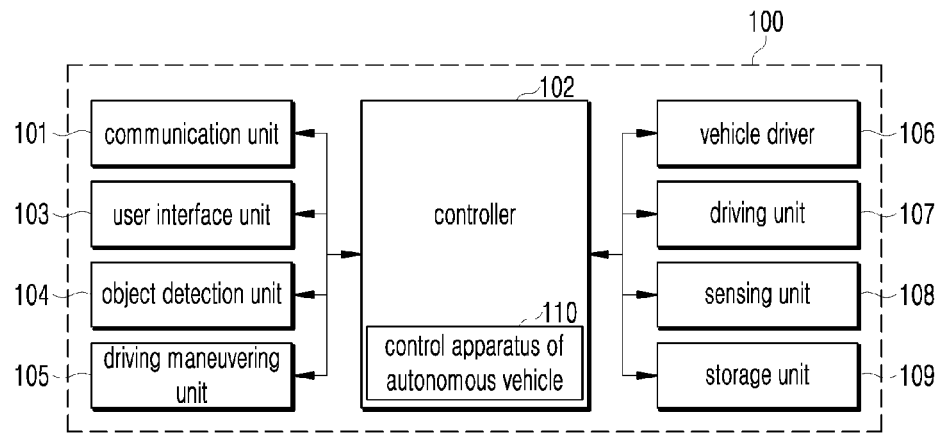
[FIG. 2]
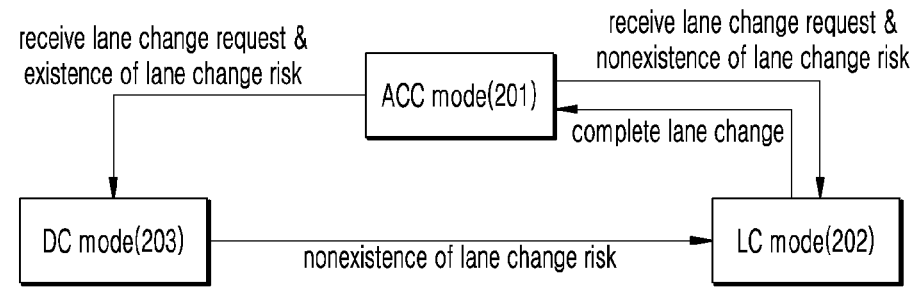
[FIG. 3]
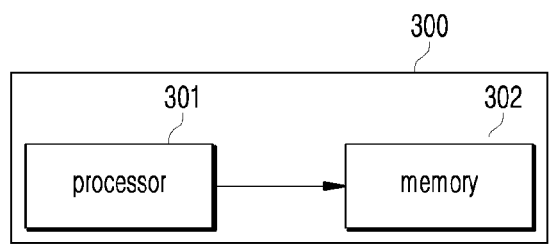

[FIG. 4]
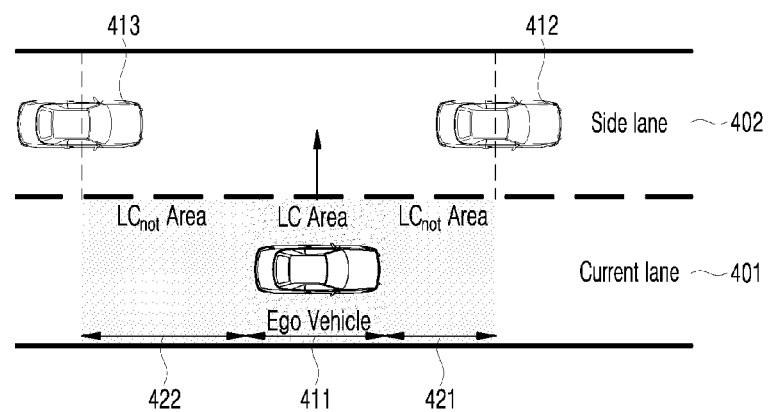
[FIG. 5]
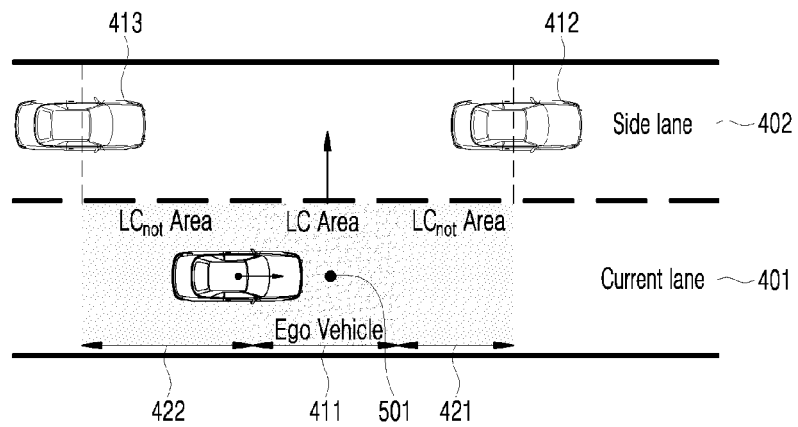

[FIG. 6]
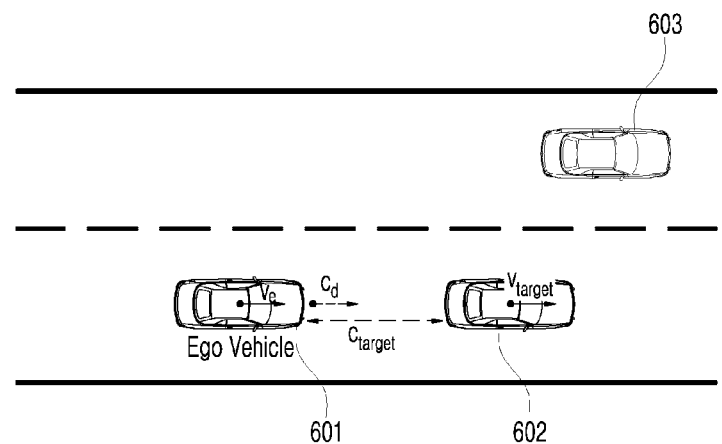
[FIG. 7]
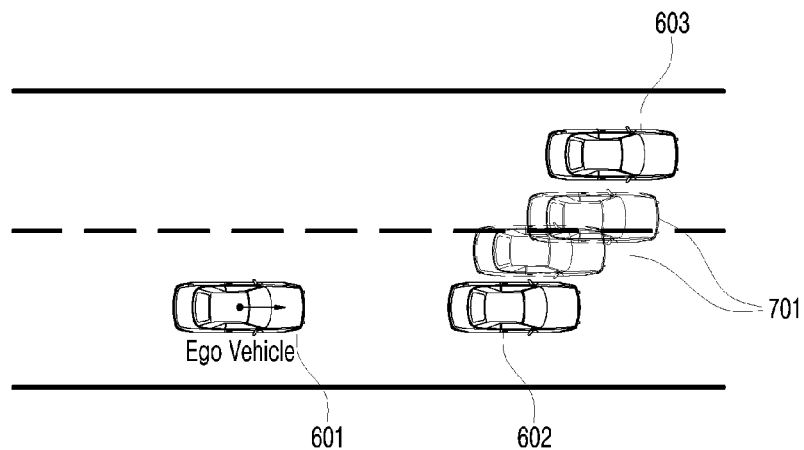

[FIG. 8]
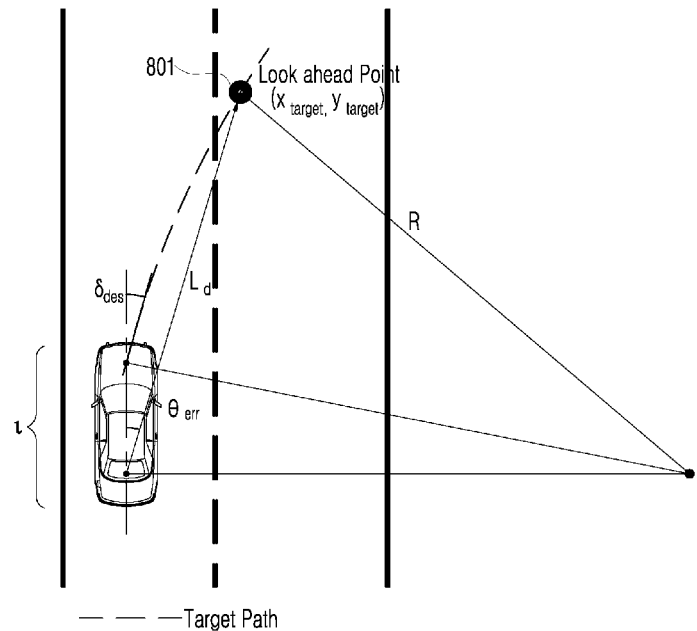
[FIG. 9]
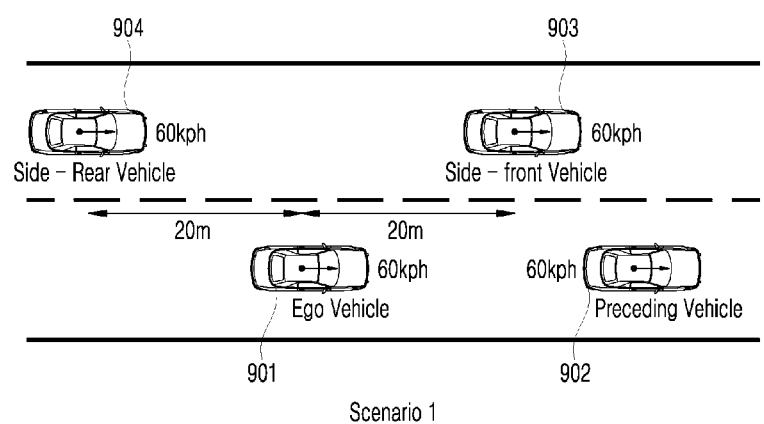
Scenario 1

[FIG. 10]
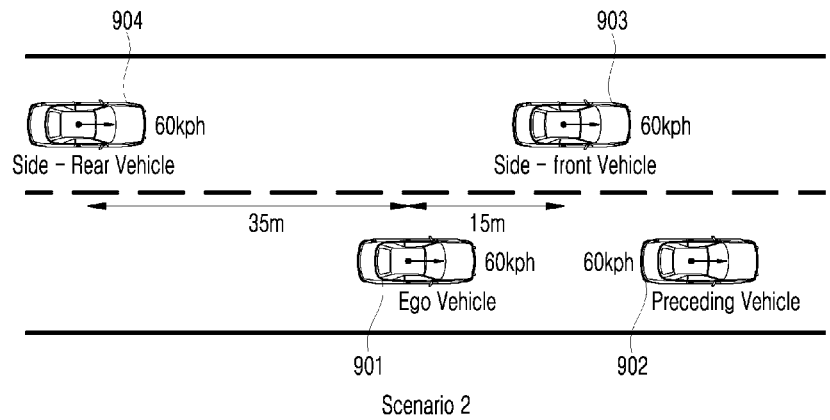
Scenario 2
[FIG. 11]
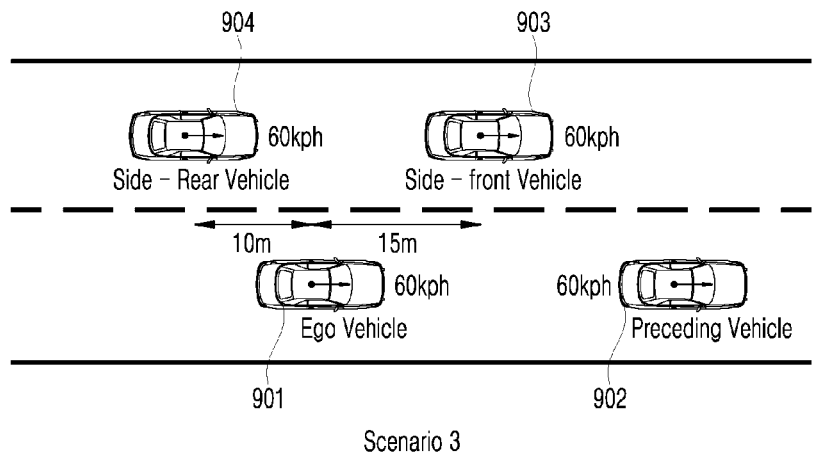
Scenario 3

[FIG. 12]
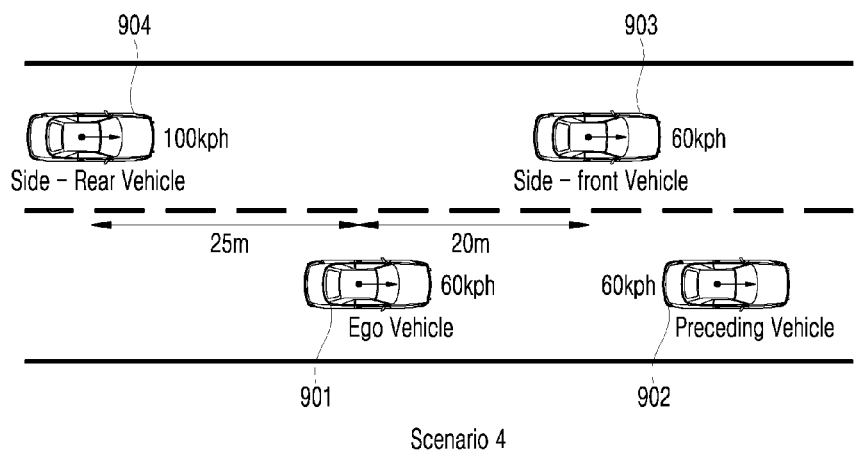
Scenario 4

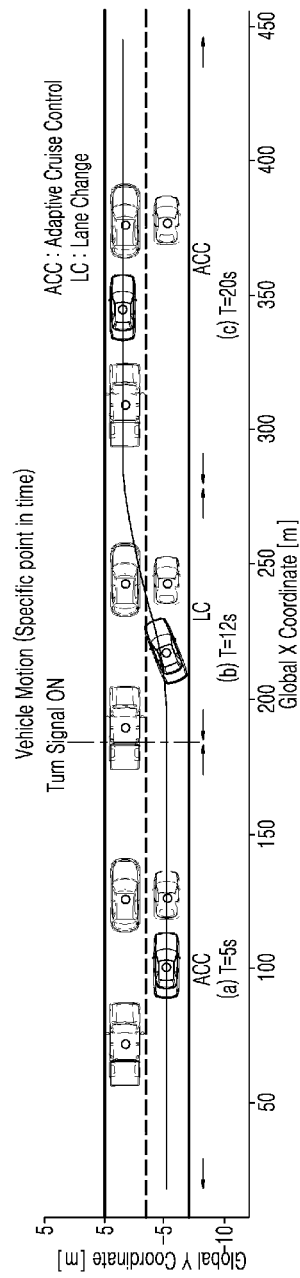
[FIG. 13]

[FIG. 14]
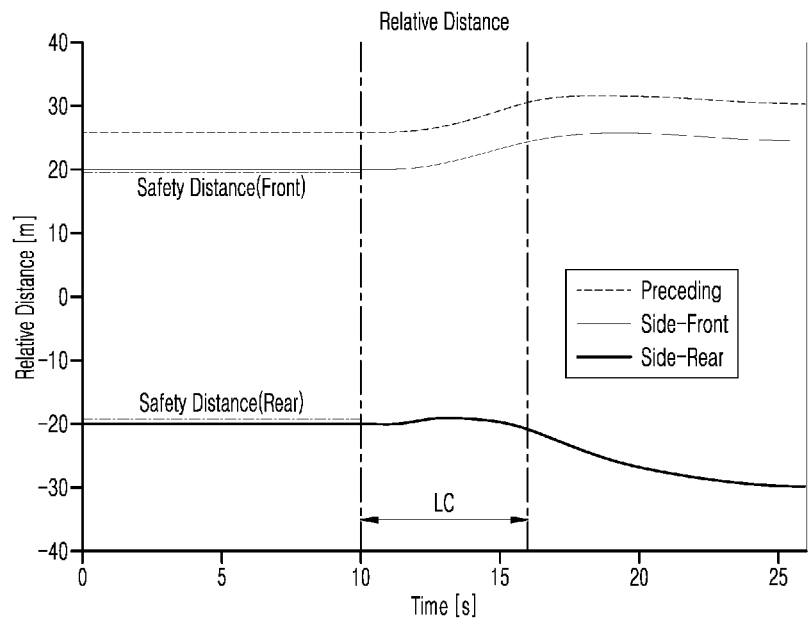
[FIG. 15]
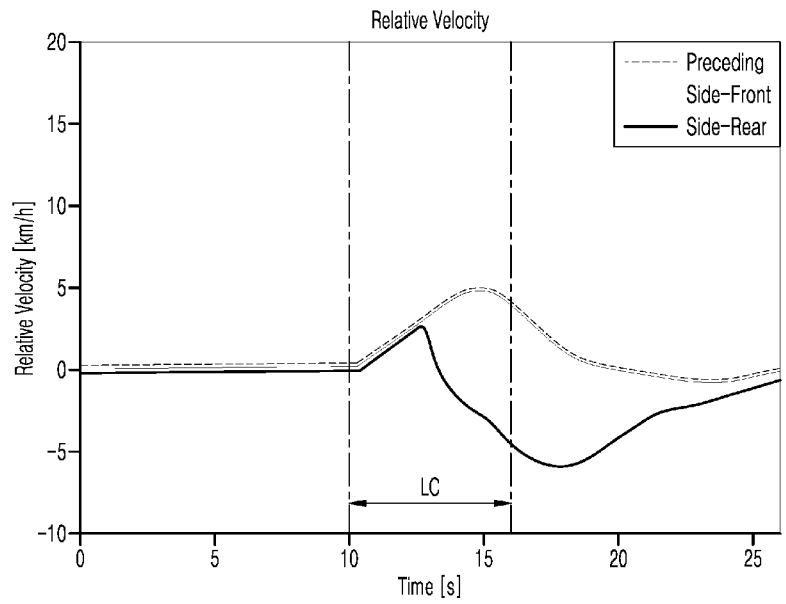

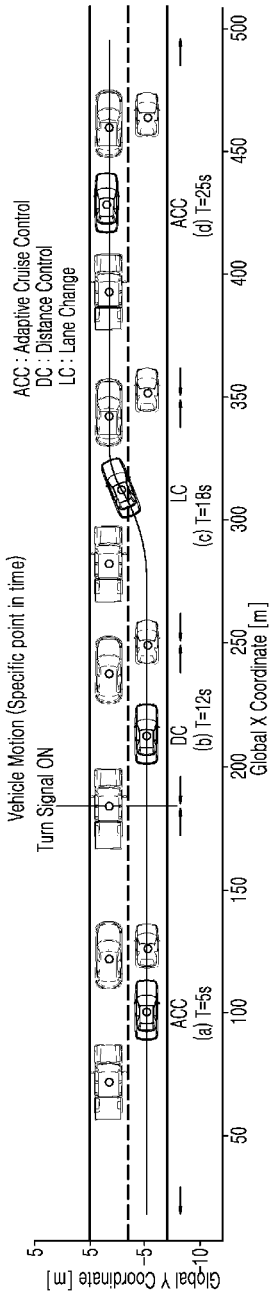
[FIG. 16]

[FIG. 17]
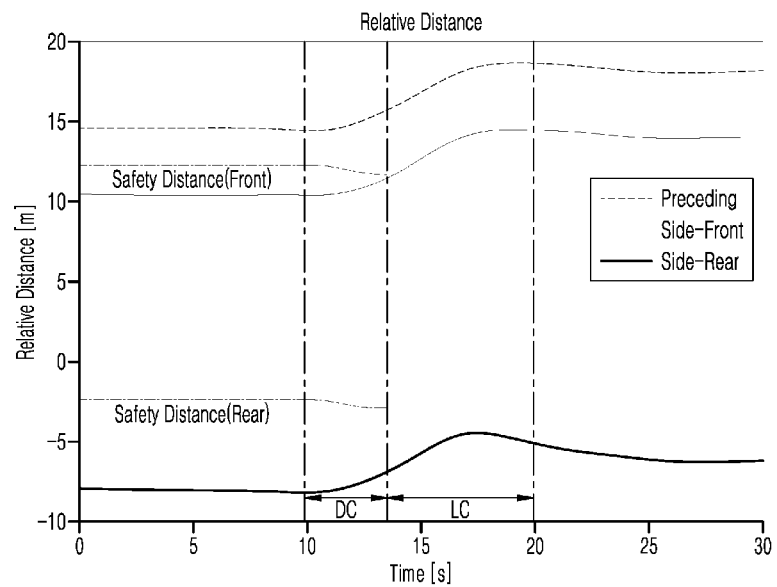
[FIG. 18]
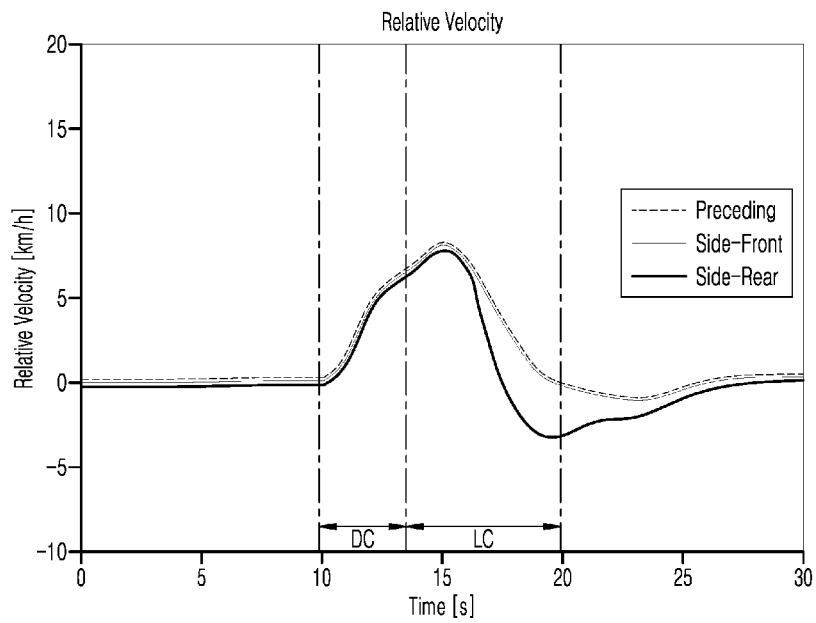

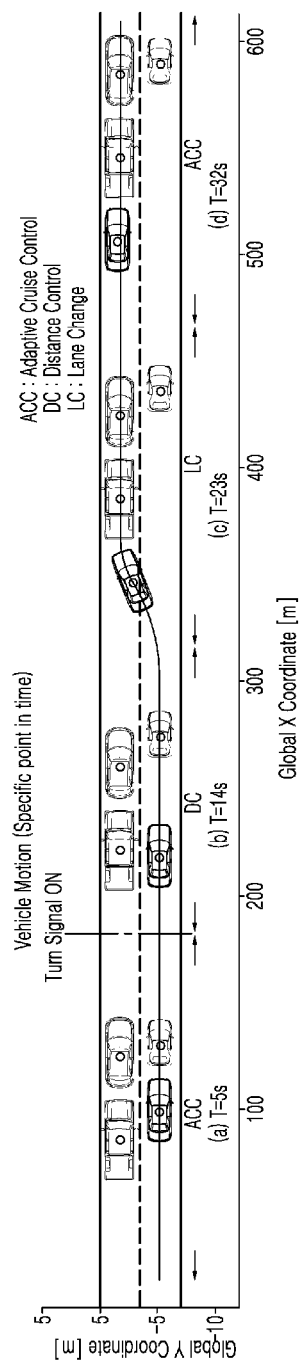

[FIG. 20]
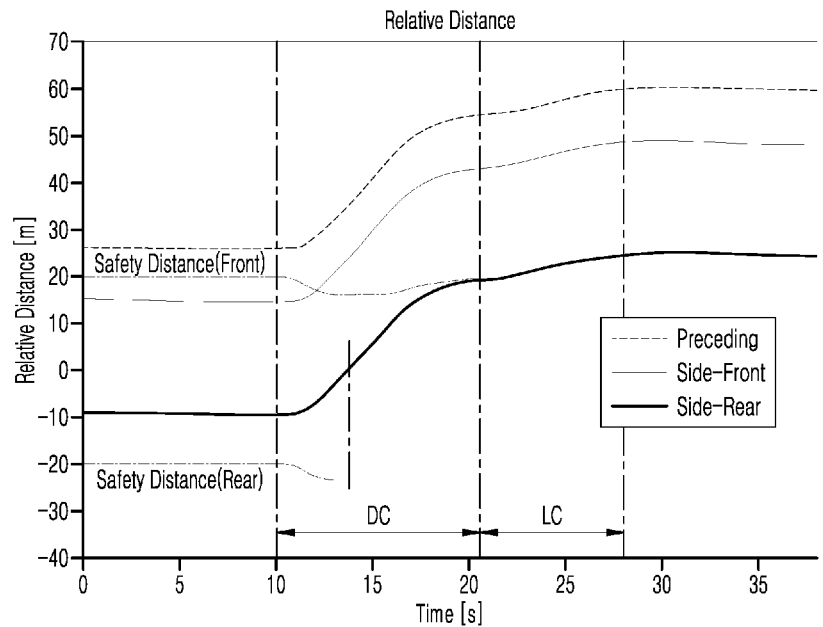
[FIG. 21]
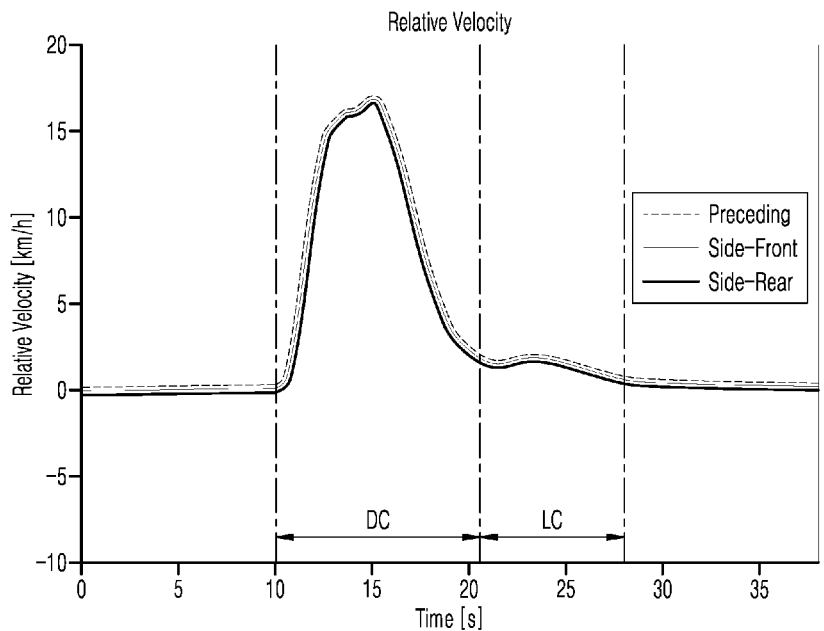

[FIG. 22]
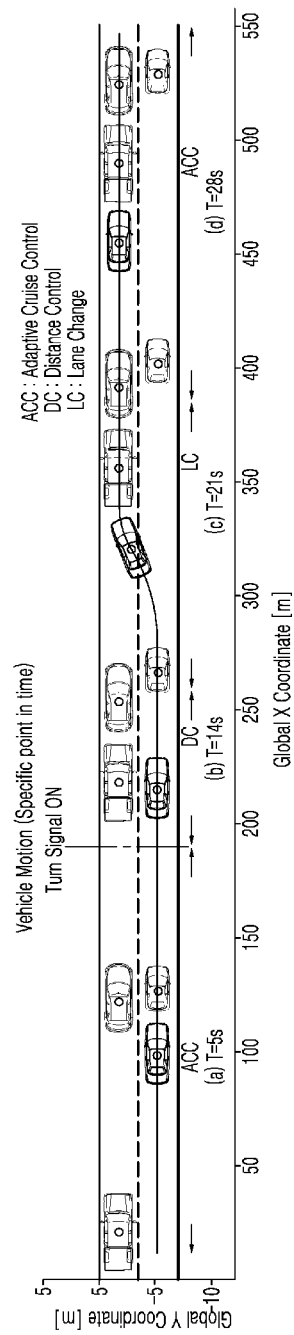

[FIG. 23]
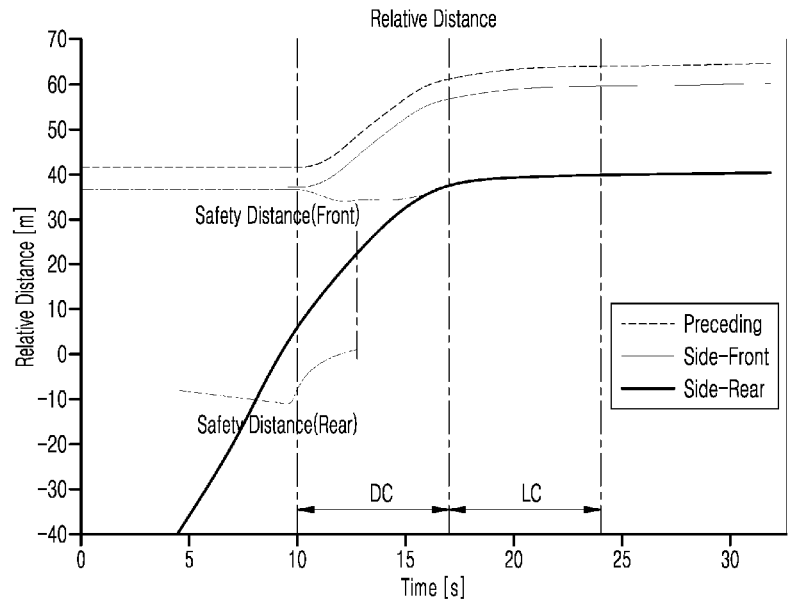
[FIG. 24]
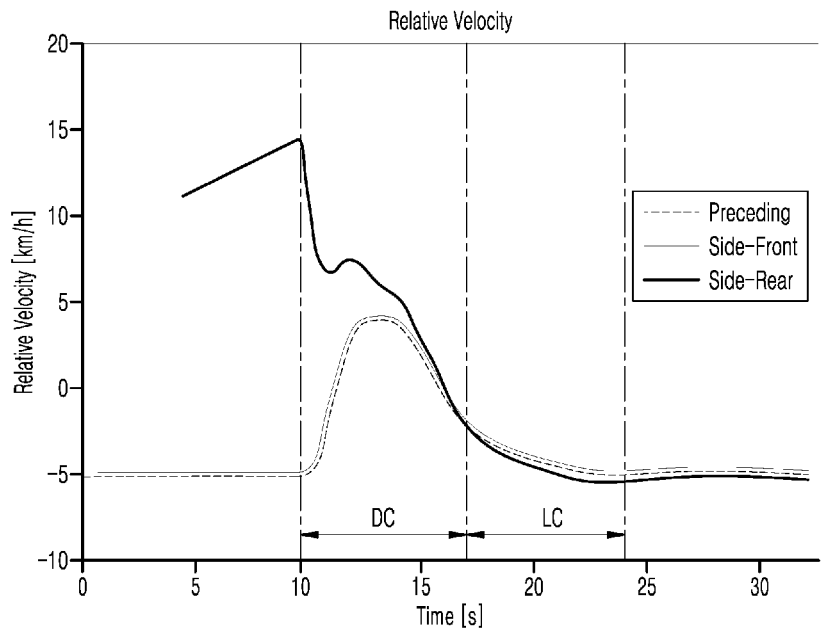

[FIG. 25]
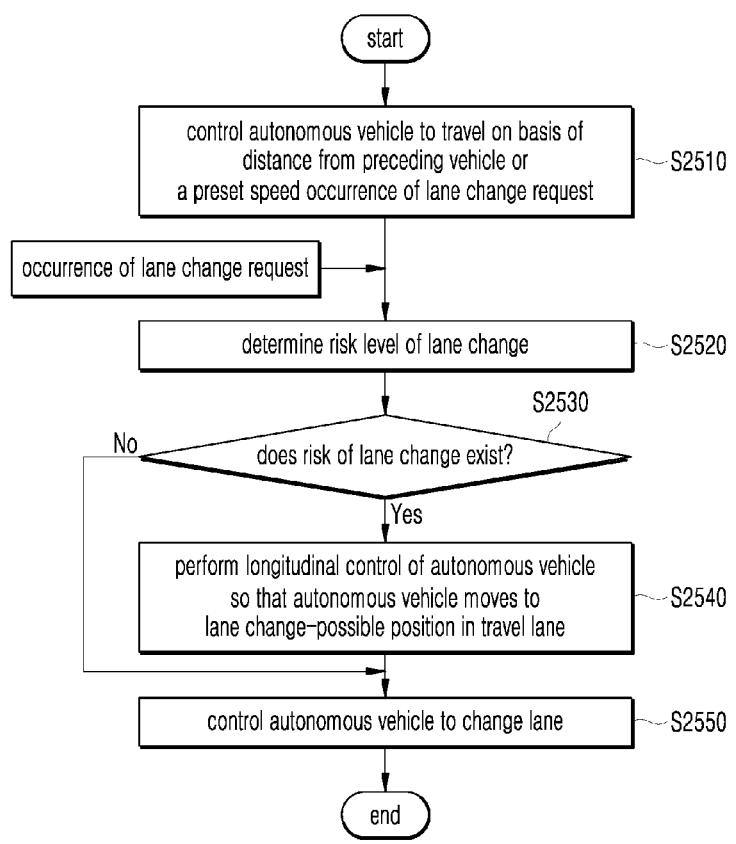

APPARATUS AND METHOD FOR CONTROLLING AUTONOMOUS VEHICLE

STATEMENT REGARDING GOVERNMENT SUPPORT

This invention was supported at least in part by Ministry of Trade, Industry and Energy of South Korean government for research project, the title of which is "Development of Safety Evaluation Methods for Environment Perception Modules and Fail-operation Technologies for Autonomous Vehicles" (Project Number: 10062448) conducted by KOOKMIN UNIVERSITY Industry Academic Cooperation Foundation.

CROSS-REFERENCE TO RELATED APPLICATION

This present application claims the benefit of priority to Korean Patent Application No. 10-2021-0097125, entitled "Development of Automated Lane Change Algorithm Considering Safety of Surrounding Vehicles," filed on Jul. 23, 2021, and No. 10-2021-0122337, entitled "CONTROL APPARATUS AND METHOD OF AUTONOMOUS VEHICLE," filed on Sep. 14, 2021, in the Korean Intellectual Property Office, the entire disclosure of which is incorporated herein by reference.

BACKGROUND OF THE INVENTION

1. Field of the Invention

The present disclosure relates to an apparatus and a method for controlling an autonomous vehicle that are capable of safely and easily performing a lane change through a positional movement of the autonomous vehicle according to a risk level based on a relative distance to an adjacent vehicle.

2. Description of the Prior Art

Automobiles have been developed to provide drivers with a comfortable and safe driving environment. In addition, safety control systems for improving the safety and convenience of drivers are being developed. Furthermore, research on an intelligent driver assistance system for providing a comfortable and safe driving environment for drivers is also being actively conducted, and is ultimately extending to research on a control system for autonomous driving or unmanned autonomous driving.

An autonomous vehicle is a vehicle that autonomously recognizes surroundings and drives without a driver's manipulation, and performs an operation of reducing the speed or changing a travel lane to avoid traffic congestion or a collision during driving when a preceding vehicle drives much slower than surrounding traffic flow.

In a lane change, the autonomous vehicle may change a lane on the basis of the distance from an adjacent vehicle.

A related art (Patent Registration No. 10-1307109) discloses a configuration for determining whether a lane change of a vehicle is safe by comparing the distance to a following vehicle with a set value, and changing a lane when it is determined that the lane change of the vehicle is safe, but does not specifically disclose a control method when it is determined that the lane change is unsafe.

Therefore, for smooth driving, there is a need for a technique enabling an autonomous vehicle to perform a lane change in a state in which a risk is removed by moving on the basis of information about an adjacent vehicle (e.g., the speed (relative speed) of the adjacent vehicle and the position (relative distance) thereof) even when it is determined that the autonomous vehicle has a risk.

RELATED DOCUMENT

Patent document: KR Patent Registration No. 10-1307109 (registered on Sep. 4, 2013)

SUMMARY OF THE INVENTION

An embodiment of the present disclosure is to control an autonomous vehicle in three driving control mode (e.g., an ACC mode, an LC mode, and a DC mode), thus enabling the autonomous vehicle to properly perform all types of driving including a lane change without a collision with an adjacent vehicle. That is, the embodiment of the present disclosure is to control the autonomous vehicle in one of the ACC mode in which the autonomous vehicle travels on the basis of the distance from a preceding vehicle or a preset speed, the LC mode in which the autonomous vehicle performs a lane change, and the DC mode in which the autonomous vehicle moves to a lane change-possible position on the basis of the risk level of a lane change, thereby enabling the autonomous vehicle to optimally travel in accordance with surrounding traffic flow.

According to an embodiment of the present disclosure, when it is determined that there is a risk of a lane change on the basis of information about an adjacent vehicle, a lane change-possible position enabling the autonomous vehicle to minimally move the movement while satisfying a constraint condition set on the basis of the information about the adjacent vehicle is determined, and the autonomous vehicle is moved to the position, thereby enabling the autonomous vehicle to safely and efficiently perform a lane change.

According to an embodiment of the present disclosure, a preceding vehicle or a side vehicle is set as a target vehicle of an autonomous vehicle for autonomous driving, and the target acceleration of the autonomous vehicle is calculated on the basis of information about the target vehicle (e.g., the speed (relative speed) of the target vehicle and the position (relative distance) thereof), in which the target acceleration of the autonomous vehicle is differently calculated depending on three driving control mode (e.g., an ACC mode, an LC mode, and a DC mode), thereby enabling the autonomous vehicle to optimally drive according to driving situations.

An embodiment of the present disclosure may be an apparatus and a method for controlling an autonomous vehicle that control an autonomous vehicle in three driving control mode (e.g., an ACC mode, an LC mode, and a DC mode), thus enabling the autonomous vehicle to properly perform all types of driving including a lane change without a collision with an adjacent vehicle.

An embodiment of the present disclosure may be an apparatus for controlling an autonomous vehicle that includes a processor and a memory configured to be operatively connected to the processor and to store at least one code performed in the processor, wherein the memory stores a code that, when executed by the processor, causes the processor to control the autonomous vehicle to travel on the basis of a distance from a preceding vehicle in a travel lane in which the autonomous vehicle travels or a preset speed, determine a risk level of a lane change on the basis of a speed of the autonomous vehicle, a speed of a side vehicle traveling in a target lane of a lane change, and a distance between the autonomous vehicle and the side vehicle upon occurrence of a lane change request, and perform longitudinal or lateral control for the lane change on the basis of the risk level.

An embodiment of the present disclosure may be an apparatus for controlling an autonomous vehicle that includes a processor and a memory configured to be operatively connected to the processor and to store at least one code performed in the processor, wherein the memory stores a code that, when executed by the processor, causes the processor to operate in any one of i) an adaptive cruise control (ACC) mode of performing longitudinal or lateral control of the autonomous vehicle on the basis of a distance from a preceding vehicle in a travel lane in which the autonomous vehicle travels or a preset speed, ii) a lane change (LC) mode of determining a risk level of a lane change on the basis of information about the autonomous vehicle and information about a side vehicle traveling in a target lane of a lane change upon occurrence of a lane change request and performing longitudinal or lateral control for the lane change on the basis of the risk level, or iii) a distant control (DC) mode of performing longitudinal control of the autonomous vehicle so that the autonomous vehicle moves to a lane change-possible position in the travel lane on the basis of the risk level upon occurrence of a lane change request.

An embodiment of the present disclosure may be a method for controlling an autonomous vehicle that includes controlling the autonomous vehicle to travel on the basis of a distance from a preceding vehicle in a travel lane in which the autonomous vehicle travels or a preset speed, determining a risk level of a lane change on the basis of a speed of the autonomous vehicle, a speed of a side vehicle traveling in a target lane of a lane change, and a distance between the autonomous vehicle and the side vehicle upon occurrence of a lane change request, and performing longitudinal or lateral control for the lane change on the basis of the risk level.

According to an embodiment of the present disclosure, it is possible to control an autonomous vehicle in three driving control mode (e.g., an ACC mode, an LC mode, and a DC mode), thus enabling the autonomous vehicle to properly perform all types of driving including a lane change without a collision with an adjacent vehicle.

According to an embodiment of the present disclosure, when it is determined that there is a risk of a lane change on the basis of information about an adjacent vehicle, it is possible to determine a lane change-possible position enabling the autonomous vehicle to minimally move the movement while satisfying a constraint condition set on the basis of the information about the adjacent vehicle, and to move the autonomous vehicle to the position, thereby enabling the autonomous vehicle to safely and efficiently perform a lane change.

According to an embodiment of the present disclosure, it is possible to set a preceding vehicle or a side vehicle as a target vehicle of an autonomous vehicle for autonomous driving, and to calculate the target acceleration of the autonomous vehicle on the basis of information about the target vehicle (e.g., the speed (relative speed) of the target vehicle and the position (relative distance) thereof), in which the target acceleration of the autonomous vehicle is differently calculated depending on three driving control mode (e.g., an ACC mode, an LC mode, and a DC mode), thereby enabling the autonomous vehicle to optimally drive according to driving situations.

BRIEF DESCRIPTION OF THE DRAWINGS

The above and other aspects, features and advantages of the present disclosure will be more apparent from the following detailed description taken in conjunction with the accompanying drawings, in which:

FIG. 1 schematically illustrates the configuration of an autonomous vehicle according to an embodiment of the present disclosure;

FIG. 2 illustrates an example of a driving control mode of an autonomous vehicle according to an embodiment of the present disclosure;

FIG. 3 schematically illustrates the configuration of a control apparatus of an autonomous vehicle according to an embodiment of the present disclosure;

FIG. 4 illustrates a process for a control apparatus of an autonomous vehicle to determine the risk level of a lane change according to an embodiment of the present disclosure and illustrates a safe area and an unsafe area derived in the process of determining the risk level;

FIG. 5 illustrates an example of a positional movement for a lane change when a control apparatus of an autonomous vehicle cannot perform a lane change of the autonomous vehicle according to an embodiment of the present disclosure;

FIG. 6 illustrates longitudinal control by a control apparatus of an autonomous vehicle according to an embodiment of the present disclosure;

FIG. 7 illustrates longitudinal control when a control apparatus of an autonomous vehicle performs a lane change according to an embodiment of the present disclosure;

FIG. 8 illustrates lateral control by a control apparatus of an autonomous vehicle according to an embodiment of the present disclosure;

FIG. 9 to FIG. 12 illustrate driving examples of a control apparatus of an autonomous vehicle under four scenarios according to an embodiment of the present disclosure;

FIG. 13 to FIG. 15 illustrate a driving result according to scenario 1 in FIG. 9;

FIG. 16 to FIG. 18 illustrate a driving result according to scenario 2 in FIG. 10;

FIG. 19 to FIG. 21 illustrate a driving result according to scenario 3 in FIG. 11;

FIG. 22 to FIG. 24 illustrate a driving result according to scenario 4 in FIG. 12; and FIG. 25 is a flowchart illustrating a method for controlling an autonomous vehicle according to an embodiment of the present disclosure.

DETAILED DESCRIPTION OF THE EXEMPLARY EMBODIMENTS

Hereinafter, embodiments disclosed herein will be described in detail with reference to the accompanying drawings, in which like or similar elements are denoted by like reference numerals regardless of drawing numerals and redundant descriptions thereof will be omitted. As used herein, the terms "module" and "unit" for components are given or interchangeably used only for ease in writing the specification and do not themselves have distinct meanings or functions. When detailed descriptions about related known technology are determined to make the gist of embodiments disclosed herein unclear in describing the embodiments disclosed herein, the detailed descriptions will be omitted herein. In addition, it should be understood that the accompanying drawings are only for easy understanding of the embodiments disclosed herein, and technical ideas disclosed herein are not limited by the accompanying drawings but include all modifications, equivalents, or substitutes included in the spirit and technical scope of the disclosure.

While terms indicating ordinal numbers, such as first and second, may be used to describe various components, such components are not limited to the above terms. The above terms are used only to distinguish one component from another.

It should be understood that when an element is referred to as being "connected" or "coupled" to another element, the element may be directly connected or coupled directly to the other element or any other element may be interposed therebetween. In contrast, it should be understood that when an element is referred to as being "directly connected" or "directly coupled" to another element, there is no element interposed therebetween.

A control apparatus of an autonomous vehicle according to an embodiment of the present disclosure may be configured as a part of a controller of the autonomous vehicle or as a separate device, and the following embodiments are described assuming that the control apparatus of the autonomous vehicle is configured as a part of a controller of the vehicle but does not exclude the control apparatus being configured as a separate device.

The autonomous vehicle may refer to any vehicle supporting autonomous driving, but refers to an ego vehicle traveling, surrounded by adjacent vehicles (e.g., a preceding vehicle, a following vehicle, a side-front vehicle, and a side-rear vehicle) in the following embodiments.

FIG. 1 schematically illustrates the configuration of an autonomous vehicle according to an embodiment of the present disclosure.

Referring to FIG. 1, the autonomous vehicle 100 may include a communication unit 101, a controller 102, a user interface unit 103, an object detection unit 104, a driving maneuvering unit 105, a vehicle driver 106, a driving unit 107, a sensing unit 108, and a storage unit 109.

The communication unit 101 is a module configured to perform communication with an external device. Here, the external device may be a user terminal, a different vehicle, or a server.

The communication unit 101 may perform, for example, short-range communication, GPS signal reception, V2X communication, optical communication, broadcast transmission and reception, and intelligent transport system (ITS) communication.

The controller 102 may control the communication unit 101, the user interface unit 103, the object detection unit 104, the driving maneuvering unit 105, the vehicle driver 106, the driving unit 107, the sensing unit 108, and the storage unit 109, thereby controlling overall operations of the autonomous vehicle 100.

The controller 102 may include a control apparatus 110 of the autonomous vehicle, or the control apparatus 110 of the autonomous vehicle according to embodiments of the present disclosure may be configured separately from the controller 102 to communicate with the controller 102.

The user interface unit 103 is configured for communication between the autonomous vehicle 100 and a vehicle user, and may receive an input signal from the user, may transmit the received input signal to the controller 102, and may provide information possessed by the autonomous vehicle 100 to the user under control by the controller 102. The user interface unit 103 may include an input module, an internal camera, a biosensing module, and an output module but is not limited thereto.

The object detection unit 104 is configured to detect an object positioned outside the autonomous vehicle 100, may generate object information on the basis of sensing data and may transmit the generated object information to the controller 102. Here, the object may include various objects related to driving of the autonomous vehicle 100, for example, a lane, a different vehicle, a pedestrian, a two-wheeled vehicle, a traffic light, light, a road, a structure, a speed bump, a landmark, and an animal.

The driving maneuvering unit 105 may receive a user input for driving. In a manual mode, the autonomous vehicle 100 may run on the basis of a signal provided by the driving maneuvering unit 105.

The vehicle driver 106 may electrically control driving of various devices in the autonomous vehicle 100. The vehicle driver 106 may electrically control driving of a power train, a chassis, a door/window, a safety device, a lamp, and an air-conditioning system in the autonomous vehicle 100.

The driving unit 107 may control various types of driving of the autonomous vehicle 100. The driving unit 107 may operate in an autonomous driving control mode.

The sensing unit 108 may sense the state of the autonomous vehicle 100, that is, detect a signal relating to the state of the autonomous vehicle 100, using a sensor mounted in the autonomous vehicle 100 and may obtain moving path information about the autonomous vehicle 100 according to the detected signal. The sensing unit 108 may provide the obtained moving path information to the controller 102.

The storage unit 109 is electrically connected to the controller 102. The storage unit 109 may store basic data for each unit of a vehicle accident prevention device, control data for controlling the operation of each unit of the vehicle accident prevention device, and input and output data. The storage unit 109 may store various types of data for the overall operation of the autonomous vehicle 100, such as a program for processing or control of the controller 102, particularly driver tendency information.

In an embodiment, the control apparatus 110 of the autonomous vehicle included in the controller 102 may control the autonomous vehicle 100 to operate in any one of an adaptive cruise control (ACC) mode, a lane change (LC) mode, and a distant control (DC) mode.

Specifically, as illustrated in FIG. 2, the control apparatus 110 of the autonomous vehicle may operate the autonomous vehicle 100 in the ACC mode 201 of performing longitudinal control or lateral control of the autonomous vehicle on the basis of the distance from a preceding vehicle in a travel lane in which the autonomous vehicle 100 travels or a preset speed.

The control apparatus 110 of the autonomous vehicle may determine the risk level of a lane change upon occurrence of a lane change request from a driver or a system (e.g., advanced driver assistance systems (ADAS) or the controller 102), and may perform longitudinal or lateral control to operate the autonomous vehicle 100 in the LC mode 202 of changing a lane when a lane change to a target lane is possible on the basis of the risk level. Here, the control apparatus 110 of the autonomous vehicle may determine the risk level of the lane change on the basis of information about the autonomous vehicle (e.g., the speed of the autonomous vehicle) and information about a side vehicle (e.g., the speed of the side vehicle) traveling in the target lane of the lane change. When the lane change to the target lane is completed, the control apparatus 110 of the autonomous vehicle may switch to the ACC mode 201.

When the lane change is impossible on the basis of the risk level of the lane change, the control apparatus 110 of the autonomous vehicle may operate the autonomous vehicle 100 in the DC mode 203 of performing longitudinal control of the autonomous vehicle to move to a lane change-possible position in the travel lane. When the risk of the lane change is removed according to the positional movement of the autonomous vehicle in the DC mode 203, the control apparatus 110 of the autonomous vehicle may switch to the LC mode 202 of performing longitudinal or lateral control for the lane change.

FIG. 3 schematically illustrates the configuration of a control apparatus of an autonomous vehicle according to an embodiment of the present disclosure.

Referring to FIG. 3, the control apparatus 300 of the autonomous vehicle may include a processor 301 and a memory 302.

The processor 301 may set a driving control mode of the autonomous vehicle to the ACC mode, thereby controlling the autonomous vehicle to travel on the basis of the distance from a preceding vehicle in a travel lane in which the autonomous vehicle travels or a preset speed.

The processor 301 may determine the risk level of a lane change upon occurrence of a lane change request and may perform lateral or longitudinal control for the lane change on the basis of the risk level. Here, the processor 301 may determine the risk level of the lane change on the basis of the speed of the autonomous vehicle, the speed of a side vehicle traveling in a target lane of the lane change, and the distance between the autonomous vehicle and the side vehicle. Here, the side vehicle may include a side-front vehicle positioned in front of the autonomous vehicle (e.g., ego vehicle) in the target lane and a side-rear vehicle positioned behind the autonomous vehicle in the target lane.

When determining that the risk level of the lane change indicates there is no risk of the lane change, the processor 301 may set a driving control mode of the autonomous vehicle to the LC mode to perform the lane change to the target lane.

However, when determining that the risk level of the lane change indicates that there is a risk of the lane change, the processor 301 may set a driving control mode of the autonomous vehicle to the DC mode, thereby performing longitudinal control of the vehicle to move to a lane change-possible position in a travel lane. Here, the processor 301 may determine the lane change-possible position (optimal position) so that the autonomous vehicle minimally moves in the travel lane according to conditions related to the distance between the autonomous vehicle and the side-front vehicle and the distance between the autonomous vehicle and the side-rear vehicle as constraint conditions.

In an embodiment, when a preceding vehicle is detected within the travel lane, the processor 301 may determine a position satisfying the constraint conditions in a rear range of the detected preceding vehicle as the lane change-possible position. That is, in the DC mode, the processor 301 may perform longitudinal or lateral control to move the autonomous vehicle to the lane change-possible position in the travel lane considering all of the preceding vehicle, the side-front vehicle, and the side-rear vehicle at the same time.

In an example of determining the risk level of the lane change, the processor 301 may determine a safety distance based on a side vehicle and may determine the risk level on the basis of the result of comparing the safety distance with the actual distance between the autonomous vehicle and the side vehicle. Here, the side vehicle may include the side-front vehicle and the side-rear vehicle running in the target lane of the lane change.

Specifically, the processor 301 may determine a first safety distance based on the side-front vehicle in proportion to the speed of the autonomous vehicle, may determine a second safety distance based on the side-rear vehicle in proportion to the speed of the side-rear vehicle, and may then determine the risk level of the lane change on the basis of the first safety distance and the second safety distance. Here, the processor 301 may determine the first safety distance further on the basis of the difference between the speed ($v_i$) of the autonomous vehicle and the speed ($v_{S_i}$) of the side-front vehicle and may determine the second safety distance further on the basis of the difference between the speed ($v_{S_i}$) of the side-rear vehicle and the speed ($v_i$) of the autonomous vehicle. That is, the processor 301 may determine the first safety distance on the basis of the speed ($v_i$) of the autonomous vehicle and a first result value of the speed ($v_i$) of the autonomous vehicle minus the speed ($v_{S_i}$) of the side-front vehicle and may determine the second safety distance on the basis of the speed ($v_{S_i}$) of the side-rear vehicle and a second result value of the speed ($v_{S_i}$) of the side-rear vehicle minus the speed ($v_i$) of the autonomous vehicle.

In addition, the processor 301 may assign a first weight to each of the speed of the autonomous vehicle and the speed of the side-rear vehicle, may assign a second weight to each of the first result value and the second result value, and may determine the first safety distance and the second safety distance further on the basis of the two weights. Here, the first weight and the second weight may be preset on the basis of a change in the speed of the side-rear vehicle due to the lane change of the autonomous vehicle and a change in the speed of the autonomous vehicle due to deceleration of the side-front vehicle during the lane change of the autonomous vehicle. A method for determining the first and second safety distances will be described in detail below with reference to FIG. 4 for convenience of description.

In an embodiment, when it is identified that the actual distance between the autonomous vehicle and the side-front vehicle exceeds the first safety distance and the actual distance between the autonomous vehicle and the side-rear vehicle exceeds the second safety distance, the processor 301 may determine that the risk level indicates there is no risk of the lane change. However, when it is identified that the actual distance between the autonomous vehicle and the side-front vehicle does not exceed the first safety distance or the actual distance between the autonomous vehicle and the side-rear vehicle does not exceed the second safety distance, the processor 301 may determine that the risk level indicates there is a risk of the lane change.

In an embodiment, the processor 301 may set an adjacent vehicle (e.g., a preceding vehicle or a side vehicle) as a target vehicle and may control the autonomous vehicle on the basis of the target vehicle.

The processor 301 may set the preceding vehicle or the side vehicle as the target vehicle, may calculate the target acceleration of the autonomous vehicle on the basis of a required control distance ($C_i$), which is a distance that the autonomous vehicle needs to move on the basis of the target vehicle, the distance ($c_{target}$) between the target vehicle and the autonomous vehicle, the speed ($v_{target}$) of the target vehicle, and the speed ($v_i$) of the autonomous vehicle, and may control the longitudinal speed of the autonomous vehicle on the basis of the target acceleration. Here, the processor 301 may calculate the target acceleration of the autonomous vehicle on the basis of a first distance between the required control distance ($C_i$) and the distance ($c_{target}$) between the target vehicle and the autonomous vehicle and a second distance between the speed ($v_{target}$) of the target vehicle and the speed ($v_i$) of the autonomous vehicle. Here, the distance ($c_{target}$) between the target vehicle and the autonomous vehicle and the required control distance ($C_i$) may be differently set depending on a driving control mode of the autonomous vehicle. As a result, the processor 301 may calculate the target acceleration of the autonomous vehicle differently for each driving control mode of the autonomous vehicle, thereby enabling the autonomous vehicle to perform optimal driving according to driving situations.

In the LC mode in which the autonomous vehicle performs a lane change to the target lane, the processor 301 may set a virtual vehicle reflecting the risk levels of the preceding vehicle and the side vehicle on the basis of the degree of approach to the target lane and may set the virtual vehicle as a target vehicle. For example, the virtual vehicle at the time of starting the lane change may reflect the risk level of the preceding vehicle more, but as the lane change is completed (as the degree of approach to the target lane increases), the virtual vehicle may reflect the risk level of the side vehicle. That is, as the degree of approach to the target lane changes during the lane change, the character (the risk reflection ratio between the preceding vehicle and the side vehicle) of the virtual vehicle may also change. Here, the degree of approach to the target lane may refer to the degree of arrival (degree of entrance) of the autonomous vehicle to the target lane when the autonomous vehicle moves from the travel lane in which the autonomous vehicle travels to the target lane of the lane change.

In the lane change, the processor 301 may set the virtual vehicle reflecting the risk levels of the preceding vehicle and the side vehicle as the target vehicle to perform delicate driving, thereby smoothly performing the lane change of the autonomous vehicle without a collision with an adjacent vehicle.

The memory 302 may be operatively connected to the processor 301 and may store at least one code in association with an operation performed by the processor 301.

In addition, the memory 302 may function to temporarily or permanently store data processed by the processor 301. Here, the memory 302 may include magnetic storage media or flash storage media, but the scope of the present disclosure is not limited thereto. The memory 302 may include an internal memory and/or an external memory, and may include a volatile memory, such as a DRAM, a SRAM, or a SDRAM, a nonvolatile memory, such as a one-time programmable ROM (OTPROM), a PROM, an EPROM, an EEPROM, a mask ROM, a flash ROM, an NAND flash memory, or an NOR flash memory, a flash drive, such as an SSD, a compact flash (CF) card, an SD card, a micro-SD card, a mini-SD card, an Xd card, or a memory stick, or a storage device, such as an HDD.

FIG. 4 illustrates a process for a control apparatus of an autonomous vehicle to determine the risk level of a lane change according to an embodiment of the present disclosure and illustrates a safe area and an unsafe area derived in the process of determining the risk level.

Referring to FIG. 4, when a lane change request is received, the control apparatus of the autonomous vehicle 411 positioned in a travel lane (current lane) 401 may determine safety distances 421 and 422 on the basis of side vehicles 412 and 413 positioned in a target lane (side lane) 402 of a lane change and may determine a risk level on the basis of the result of comparing the actual distances between the autonomous vehicle 411 and the side vehicles 412 and 413 with the safety distances 421 and 422.

Here, the control apparatus of the autonomous vehicle 411 positioned in the travel lane 401 may determine a first safety distance ($c_{safety,sf}$) 421 based on a side-front vehicle 412 disposed in front of the autonomous vehicle 411 in the target lane 402 and a second safety distance ($c_{safety,}$) 422 based on a side-rear vehicle 413 disposed behind the autonomous vehicle 411 in the target lane 402 according to Equation 1. Here, the first and second safety distances 421 and 422 may be determined on the basis of the center of the side-front vehicle 412 and the center of the side-rear vehicle 413, respectively, but are not limited thereto. For example, the first safety distance 421 may be determined on the basis of a rear side of the side-front vehicle 412, and the second safety distance 422 may be determined on the basis of a front side of the side-rear vehicle 413.

$$c_{safety,sf} = \tau_{abs}v_e + \tau_{rel}(v_e - v_{sf})$$ [Equation 1]

Here, $v_e$ is the speed of the autonomous vehicle 411, $v_S$ is the speed of the side-front vehicle 412, and $v_{S'}$ is the speed of the side-rear vehicle 413.

In Equation 1, (1a) for determining the first safety distance may include a first term reflecting the absolute speed of the autonomous vehicle 411 and a second term reflecting a relative speed between the autonomous vehicle 411 and the side-front vehicle 412. Here, the first term increases as the speed of the autonomous vehicle 411 increases. The second term is obtained as 0 when the relative speed between the autonomous vehicle 411 and the side-front vehicle 412 is 0, increases when the space between the autonomous vehicle 411 and the side-front vehicle 412 decreases, and decreases when the space between the autonomous vehicle 411 and the side-front vehicle 412 increases.

(1b) of Equation 1 for determining the second safety distance is different from (1a) of Equation 1 for determining the first safety distance only in that a preceding vehicle is the autonomous vehicle 411 and a following vehicle is the side-rear vehicle 413 and employs the same safety distance calculation method as in (1a) of Equation 1 for determining the first safety distance In (1a) of Equation 1 for determining the first safety distance, an absolute tau ($\tau_{abs}$) and a relative tau ($\tau_{rel}$) are weights as a concept of time gap, by which a safety distance term (first term) reflecting the absolute speed and a safety distance term (second term) reflecting the relative speed that are multiplied, respectively, and are tuning parameters for seeking a compromise between conflicting aspects, which are aggressiveness and safety, in the lane change.

The absolute tau ($\tau_{abs}$) is a first weight and is a parameter that enables an improvement in safety as the lane change is performed in a relatively long inter-vehicle distance due to an increase in the safety distance reflecting the absolute speed with the parameter having a greater value, and enables an improvement in aggressiveness as the lane change is performed in a relatively short inter-vehicle distance due to a decrease in the safety distance with the parameter having a smaller value.

The relative tau ($\tau_{rel}$) is a second weight, and as the relative tau increases, the increase rate or decrease rate of the safety distance term reflecting the relative speed is maximized. That is, in an illustrative case where the side vehicle approaches the autonomous vehicle with a speed difference, as the relative tau ($\tau_{rel}$) increases, the autonomous vehicle 411 performs the lane change more defensively (with safety), and as the relative tau ($\tau_{rel}$) decreases, the autonomous vehicle 411 performs the lane change more aggressively (actively).

The absolute tau ($\tau_{abs}$) and the relative tau ($\tau_{rel}$) may be set in comprehensive consideration of a risk that may be caused by sudden braking of the side-front vehicle during a lane change and a risk that may occur in the side-rear vehicle due to a forcible lane change of the autonomous vehicle.

When the safety distances 421 and 422 based on the side vehicles 412 and 413 are determined, the control apparatus of the autonomous vehicle 411 may determine the risk level of the lane change on the basis of the result of comparing the actual distances between the autonomous vehicle 411 and the side vehicles 412 and 413 with the safety distances 421 and 422. The risk level of the lane change may be represented by Equation 2.

$$i_{LC} = i_{sf} \cap i_{sr} \quad \text{[Equation 2]}$$

where $\{i_{sf} := |d_{sf} - c_{safety.sf}| \geq 0$

Here, $i_{LC}$ may denote a determination index of the risk level of the lane change.

That is, when it is identified that the actual distance ($d_{sf}$) between the autonomous vehicle 411 and the side-front vehicle 412 exceeds (or is greater than) the first safety distance 421 and the actual distance ($d_{sr}$) between the autonomous vehicle 411 and the side-rear vehicle 413 exceeds (or is greater than) the second safety distance 2 (when the autonomous vehicle is positioned in a safe area in which a lane change is possible), the control apparatus of the autonomous driving vehicle 411 may determine that the risk level indicates that there is no risk of a lane change and may control the autonomous vehicle 411 to perform a lane change.

When it is identified that the actual distance between the autonomous vehicle 411 and the side-front vehicle 412 does not exceeds the first safety distance 421 or the actual distance between the autonomous vehicle 411 and the side-rear vehicle 413 does not exceed the second safety distance 422 (when the autonomous vehicle is positioned in an unsafe area), the control apparatus of the autonomous vehicle 411 may determine that the risk level indicates that there is a risk of a lane change and may restrain a lane change of the autonomous vehicle 411. The control apparatus of the autonomous vehicle 411 may move the autonomous vehicle 411 to a lane change-possible position and may then perform a lane change.

FIG. 5 illustrates an example of a positional movement for a lane change when a control apparatus of an autonomous vehicle cannot perform a lane change of the autonomous vehicle according to an embodiment of the present disclosure.

Referring to FIG. 5, as a result of determining the risk level of a lane change as a lane change request is received, when it is determined that the risk level indicates that there is a risk of a lane change and thus a lane change is impossible, the control apparatus of the autonomous vehicle 411 may move the autonomous vehicle 411 to a lane change-possible position within a travel lane.

The control apparatus of the autonomous vehicle may determine the lane change-possible position (x, y) 501 according to Equation 3.

Minimize $f(x,y)=x^2+y^2$ [Equation 3]

subject to:

$g_1 = d_{sf} - c_{safety,sf} \geq 0$ $g_2 = d_{sr} - c_{safety,sr} \geq 0$ $g_3 = d_p - c_p \geq 0$ That is, the control apparatus of the autonomous driving vehicle 411 may determine the lane change-possible position so that the autonomous vehicle 411 minimally moves in the travel lane according to conditions (3b), (3c), (3d), and (3e) of Equation 3 as constraint conditions. Here, when a preceding vehicle is detected in the travel lane, the control apparatus of the autonomous vehicle may determine a position satisfying the constraint conditions other than (3d) in a rear range ((3d) of Equation 3) of the detected preceding vehicle as the lane change-possible position.

(3b) and (3c) in Equation 3 are constraint conditions of inequations for finding an optimal point inside a lane change-possible area and are as described in Equation 2.

(3d) in Equation 3 is a constraint condition of an inequation for preventing the optimal point of the autonomous vehicle from being positioned in front of the preceding vehicle. Here, $d_p$ is the distance from (x, y) to the preceding vehicle, and $c_p$ is the distance from the autonomous vehicle to the preceding vehicle. (3d) in Equation 3 is a cubic polynomial representing the path of the autonomous vehicle currently driving and is a constraint condition for the optimal point to be positioned in the current travel lane of the autonomous vehicle. When a current driving road is a straight line, all coefficients of (3e) in Equation 3 are 0, and y may be excluded from an objective function of (3a) in Equation 3. When the current driving road is curved, y may be included in the objective function of (3a).

The control apparatus of the autonomous vehicle may define a Lagrange function (L) as in Equation 4 through the objective function (3a) and the constraint conditions (3b, 3c, 3d, and 3e) of Equation 3.

$$L = f(x, y) + \sum_{i}^{3} \lambda_i (g_i + s_i^2) \quad \text{[Equation 4]}$$

Here, $\lambda_i$ may denote a Lagrange multiplier, and $s_i$ may denote a slack variable with respect to the constraint conditions of the inequations. The control apparatus of the autonomous vehicle performs partial differentiation of the Lagrange function of Equation 4 with respect to an optimization variable, the Lagrange multiplier, and the slack variable to obtain the solution of the equation of Equation 5, thereby deriving the optimal point inside the lane change-possible area.

$$\nabla L = \left( \frac{\partial L}{\partial x}, \frac{\partial L}{\partial y}, \frac{\partial L}{\partial \lambda_i}, \frac{\partial L}{\partial s_i^2} \right) \quad \text{[Equation 5]}$$

Here, the optimal point is positioned inside a safe area and is a position in which a safety distance is secured for the preceding vehicle and a side vehicle. In addition, the optimal point is a position in which a lane change can be safely performed with a minimal movement while satisfying the aforementioned constraint conditions of the autonomous vehicle.

FIG. 6 illustrates longitudinal control by a control apparatus of an autonomous vehicle according to an embodiment of the present disclosure.

Referring to FIG. 6, the control apparatus of the autonomous vehicle 601 may set one of adjacent vehicles as a target vehicle in all modes except for a constant speed control mode of the ACC mode among the three modes (ACC mode, LC mode, and DC mode) and may control the autonomous vehicle 601. The control apparatus of the autonomous vehicle 601 may control the autonomous vehicle 601 according to a longitudinal control algorithm based on optimal control of a linear quadratic regulator (LQR). Here, the target vehicle may be a preceding vehicle 602 in the same lane as the autonomous vehicle 601 or a side vehicle 603 in a lane (target lane) to which the autonomous vehicle 601 is to move according to a driving control mode.

A state equation illustrating a relationship between the autonomous vehicle 601 and the target vehicle may be represented by Equation 6.

$$\dot{X} = A_X + Bu \qquad \text{[Equation 6]}$$
$$= \begin{bmatrix} 0 & -1 \\ 0 & 0 \end{bmatrix} X + \begin{bmatrix} 0 \\ -1 \end{bmatrix} u$$

where

Here, u is the acceleration of the autonomous vehicle, $c_d$ is a required control distance for the target vehicle, and $c_{target}$ is a relative distance to the target vehicle. Further, $v_{target}$ is the speed of the target vehicle, and $v_e$ is the speed of the autonomous vehicle.

A state variable $\chi$ in Equation 6 includes two variables. A first state variable may refer to an error with respect to a target distance value, and a second state variable may refer to an error with respect to a target speed value.

In an embodiment, the control apparatus of the autonomous vehicle 601 may define a cost function as in Equation 7 to calculate the target acceleration of the autonomous vehicle 601.

$$J = \int_0^\infty (\chi^T Q \chi + u^T R u) dt \qquad \text{[Equation 7]}$$

where $Q = [\sigma_1 \ 0]$

Here, Q and R are design factors and may include a weight for an error in the target distance value of the autonomous vehicle 601, a weight for an error in the target speed value of the autonomous vehicle 601, and a weight for a change in the acceleration of the autonomous vehicle 601. Here, each weight may be set through a plurality of tuning processes based on safety of the autonomous vehicle 601 and the adjacent vehicles (e.g., the preceding vehicle, a side-front vehicle, and a side-rear vehicle).

The control apparatus of the autonomous vehicle 601 may derive an optimal gain that minimizes the cost function of Equation 7, for example, from a matrix-type Riccati equation, and may calculate the target longitudinal acceleration of the autonomous vehicle through feedback on the state variable of Equation 8.

$$a_{dcs} = K_X \qquad \text{[Equation 8]}$$
$$a_{dcs^*} = \begin{cases} a_{max} & \text{if } a_{dcs} > a_{max} \\ a_{min} & \text{if } a_{dcs} > a_{min} \end{cases}$$

Although a term for limiting the level of acceleration of the autonomous vehicle 601 is included in the cost function of Equation 7, the target acceleration calculated through the feedback on the state variable in (8a) of Equation 8 may still have a large value, and thus (8b) of Equation 8 may be an equation for limiting the target acceleration to an appropriate value within a maximum value.

In addition, (8b) of Equation 8 is for preventing a movement that disrupts a driver's ride quality, such as sudden acceleration and sudden deceleration.

When the target acceleration of the autonomous vehicle 601 is calculated, the control apparatus of the autonomous vehicle 601 may control a longitudinal movement of the autonomous vehicle 601 by applying the target acceleration as an input value of an acceleration/deceleration actuator.

In an embodiment, the control apparatus of the autonomous vehicle may set different values included in the state variable to perform optimal longitudinal control according to characteristics for each of the three driving control modes, that is, the ACC mode (constant distance control mode), the LC mode, and the DC mode.

When the preceding vehicle is set as the target vehicle in the ACC mode (constant distance control mode), the control apparatus of the autonomous vehicle may set a component of the state variable as in Equation 9.

$$\mathcal{X} = [(c_d - c_{target}), (v_{target} - v_e)]^T \qquad \text{[Equation 9]}$$
$$\text{with } \begin{cases} c_d = c_0 + \tau v_p \\ c_{target} = c_p \end{cases}$$

Here, the required control distance may include a safety braking distance ($c_0$), a time gap ($\tau$), and the speed ($v_p$) of the preceding vehicle. $c_p$ is a relative distance to the preceding vehicle.

In addition, when a vehicle that does not assure a safety distance among vehicles in a lane to move to is set as the target vehicle in the DC mode, the control apparatus of the autonomous vehicle may set a component of the state variable as in Equation 10.

$$\mathcal{X} = [(c_d - c_{target}), (v_{target} - v_e)]^T \qquad \text{[Equation 10]}$$
$$\text{with } \begin{cases} c_d = \sqrt{(x_{side} - x_{opt})^2 + (y_{side} - y_{opt})^2} \\ c_{target} = c_{side} \end{cases}$$

Here, since it is necessary to secure a safety distance for the vehicle in the lane to move to, the required control distance may be represented by the distance between the position ($x_{side}$, $y_{side}$) of the target vehicle in the lane to move to and an optimal point ($x_{opt}$, $y_{opt}$) for a lane change derived through Equation 3 to Equation 5.

$c_{side}$ and $v_{side}$ denote a relative distance to the vehicle in the lane to move to and the speed of the vehicle, respectively.

In addition, as shown in FIG. 7, when a lane change is performed in the LC mode, the control apparatus of the autonomous vehicle may derive one virtual vehicle 701 reflecting a risk level with respect to the preceding vehicle and the vehicle in the lane to move to (two vehicles), and may set a component of the state variable as in Equation 11 when the virtual vehicle is set as the target vehicle. Here, the control apparatus of the autonomous vehicle may derive the one virtual vehicle reflecting the risk level with respect to the two vehicles considering that the autonomous vehicle needs to perform a lane change while maintaining a safety distance to the preceding vehicle and the vehicle in the lane to move to.

$$\mathcal{X} = [(c_d - c_{target}), (v_{target} - v_e)]^T \quad \text{[Equation 11]}$$

$$\text{with } \begin{cases} c_d = \beta(c_0 + \tau v_{side}) + (1 - \beta) \\ c_{target} = \beta c_{side} + (1 - \beta) c_p \end{cases}$$

Here, the control apparatus of the autonomous vehicle may use a lateral approach weight β that reflects the degree of lateral approach to the lane to move to in order to derive the one virtual vehicle in consideration of the risk level with respect to the two vehicles. That is, as shown in Equation 11, the control apparatus of the autonomous vehicle may set the component of the state variable on the basis of the lateral approach weight β with respect to each of the preceding vehicle and the vehicle on the lane to move to such that the virtual vehicle reflects the side vehicle as the autonomous vehicle reaches the target lane.

The control apparatus of the autonomous vehicle may assign the lateral approach weight β, thereby changing ratios in which the virtual vehicle reflects the preceding vehicle and the vehicle in the lane to move to in the required control distance, the relative distance, and the absolute speed according to the degree to which the autonomous vehicle enters the lane to move to. That is, during the lane change, the control apparatus of the autonomous vehicle may enable the autonomous vehicle to perform distance control initially with higher weight given to the preceding vehicle in the beginning and may enable the autonomous vehicle to perform distance control latterly with higher weight given to the vehicle in the lane to move to. Accordingly, the autonomous vehicle may change a lane while maintaining an appropriate safety distance to the two vehicles during the lane change, and may smoothly switch to the ACC mode after completing the lane change.

FIG. 8 illustrates lateral control by a control apparatus of an autonomous vehicle according to an embodiment of the present disclosure.

The control apparatus of the autonomous vehicle may perform not only longitudinal control but also lateral control. That is, the control apparatus of the autonomous vehicle may perform lateral control in all three modes (the ACC mode, the LC mode, and the DC mode). The control apparatus of the autonomous vehicle may perform lateral control within a travel lane to maintain the current lane in the ACC mode and the DC mode, and may perform lateral control for a lane change in the LC mode.

When performing the lateral control for maintaining the lane in the ACC mode and the DC mode, the control apparatus of the autonomous vehicle may generate a center line of the ego lane or a line in the middle of the distance to vehicles traveling in a side lane as a target path. Here, the center line of the ego lane may be generated, for example, using an image sensor or a general method based on a high-definition (HD) map.

In an embodiment, the control apparatus of the autonomous vehicle may generate a path for a lane change, for example, using a cubic spline curve in the LC mode. Here, the path may be represented by a cubic polynomial of Equation 12.

$$S(x) = b_3 x^3 + b_2 x^2 + b_1 x + b_0 \quad \text{[Equation 12]}$$

Considering characteristics of a lane change path, four conditions for determining a coefficient value of the cubic polynomial of Equation 12 are illustrated in Equation 13.

$$S(x_0) = y_0$$

$$S(x_f) = y_f(x_f = d_0 + v_r \tau_s)$$

$$S'(x_0) = 0 \quad \text{[Equation 13]}$$

$(x_0, y_0)$ is the current position of the autonomous vehicle, and $(x_f, y_f)$ is a point in a lane to move to. According to the characteristics of the lane change path that need to be considered for the vehicle to safely change a lane, for example, an abrupt steering input needs to be avoided in high-speed driving, and path tracking for lane maintenance after accurate approach to the lane to move to needs to be performed without any problem. To this end, the speed of the autonomous vehicle may be reflected as a factor determining the point $(x_f, y_f)$ in the lane to move to.

After generating a path for lane maintenance or lane change in the three modes, the control apparatus of the autonomous vehicle may perform lateral control to track the path. The control apparatus of the autonomous vehicle may track the path, for example, on the basis of a pure pursuit path tracking method. Specifically, as shown in FIG. 8, the control apparatus of the autonomous vehicle may set a point on the path as a look ahead point 801 to track the target path and may generate a required steering angle of the autonomous vehicle to pass the look ahead point. The look ahead point is an important parameter that determines path tracking performance and steering stability of the vehicle and may be set on the basis of the speed of the autonomous vehicle as shown in Equation 14.

$$L_d = \kappa v_e \quad \text{[Equation 14]}$$

Here, $L_d$ is a distance to the look ahead point on the target path considering the speed ($v_e$) of the autonomous vehicle, and κ is a parameter for generating a stable required steering angle of the autonomous vehicle by setting an appropriate look ahead point for each of two cases including lane maintenance and lane change.

Here, a final required steering angle ($\delta_{des}$) for tracking the target path may be represented by Equation 15.

$$\delta_{des} = \frac{1}{R} = \frac{2l\sin(i)}{R} \quad \text{[Equation 15]}$$

Here, l is the wheelbase of the vehicle, $\theta_{err}$ is the yaw angle of a look ahead point based on an autonomous vehicle coordinate system, and R is a turning radius.

When the required steering angle of the autonomous vehicle is calculated through the pure pursuit algorithm, the control apparatus of the autonomous vehicle may apply the required steering angle of the autonomous vehicle as an input value of a steering actuator, thereby controlling a lateral movement of the vehicle.

Hereinafter, various driving examples of a control apparatus of an autonomous vehicle will be described with reference to FIG. 9 to FIG. 12. FIG. 9 to FIG. 12 illustrate driving examples of a control apparatus of an autonomous vehicle under four scenarios according to an embodiment of the present disclosure.

In FIG. 9 to FIG. 11, the autonomous vehicle 901 may follow a preceding vehicle 902, for example, at 60 km/h. Accordingly, since the autonomous vehicle 901 and the preceding vehicle 902 are traveling at the same speed, the distance between the autonomous vehicle 901 and the preceding vehicle 902 may be maintained at an initially set distance until a lane change. In FIG. 12, a side-rear vehicle 904 may approach at a high speed of 100 km/h and may then rapidly decelerate to follow a side-front vehicle, and the autonomous vehicle 901 may receive a lane change request when the side-rear vehicle 904 reaches a distance of 25 m behind the autonomous vehicle 901.

Further, in FIG. 9 to FIG. 11, a time gap having a value in a set range (e.g., 1.5 seconds to 2.2 seconds) may be used as an index indicating a minimum distance secured for safety in time when the autonomous vehicle 901 follows the preceding vehicle 902 with a certain distance maintained. In FIG. 9 to FIG. 11, the autonomous vehicle 901 may follow the preceding vehicle 902 with a time gap of 1.5 seconds, which is the smallest value in the set range values, until receiving the lane change request. Here, adjacent vehicles (the preceding vehicle, a side-front vehicle, and the side-rear vehicle) may operate in the ACC mode. A set speed in an ACC constant speed control mode may be set to a predetermined value, and a set time gap in an ACC constant distance control mode may be set on the basis of the result of analyzing manual driving characteristics of a driver according to age and gender.

In all of the four scenarios, for example, it may be assumed that the lane change is received by a driver operating a turn signal lamp or determination by an autonomous driving logic at 10 seconds. A driving control mode of the autonomous vehicle 901 is divided into the ACC mode, the LC mode, and the DC mode. The ACC mode indicates a state in which the autonomous vehicle 901 follows the preceding vehicle 902 at a constant distance until the lane change request, and the LC mode indicates a transition state in which the autonomous vehicle 901 changes a lane. The DC mode indicates a state in which the autonomous vehicle 901 is moving to an optimal point because the autonomous vehicle 901 cannot immediately change a lane.

FIG. 13 to FIG. 15 illustrate a driving result according to scenario 1 in FIG. 9.

FIG. 13 illustrates driving situations at 5 seconds, 12 seconds, and 20 seconds, respectively. A lane change request is received at 10 seconds or about 190 m while the autonomous vehicle is following the preceding vehicle with a time gap of 1.5 seconds. The side-front vehicle and the side-rear vehicle are running at the same speed of 60 km/h until 10 seconds. The side-rear vehicle is running at a distance of 40 m from the side-front vehicle until 10 seconds, and this distance corresponds to an interval greater than a previously set time gap of 1.8 seconds of the side-front vehicle, thus considering that the ACC constant distance control mode of the side-rear vehicle does not operate.

FIG. 14 and FIG. 15 illustrate relative distances and relative speeds of the preceding vehicle and the side vehicles viewed from the autonomous vehicle. At the time of the lane change request, the relative distances of the side-front vehicle and the side-rear vehicle are 20 m and −20 m, respectively. These distances satisfy a side-front safety distance and a side-rear safety distance, which are 20 m, obtained according to Equation 1 based on the speed of the autonomous vehicle and the speeds of the side vehicles, and accordingly the autonomous vehicle may immediately perform a lane change without any additional movement for securing a safety distance.

FIG. 15 shows that the autonomous vehicle decelerates with respect to the side-front vehicle to make a speed difference of up to 5 km/h in a lane change (LC) area, which may be considered as a strategy for following the side-front vehicle as a new preceding vehicle at a time gap of 1.5 seconds after the lane change.

Referring to FIG. 15, the autonomous vehicle decelerates from 10 seconds when receiving the lane change request, while the side-rear vehicle decelerates from about 12.5 seconds. This is because even though the autonomous vehicle starts the lane change, it takes a certain time for the side-rear vehicle to recognize the autonomous vehicle as a vehicle entering the ego lane. Subsequently, the side-rear vehicle decelerates to make a speed difference of up to 6 km/h from the speed of the autonomous vehicle, which is for the side-rear vehicle to follow the autonomous vehicle as a new preceding vehicle at a time gap of 1.8 seconds after the lane change of the autonomous vehicle.

FIG. 13 to FIG. 15 show that the autonomous vehicle performs the lane change within a range that the autonomous vehicle does not cause a threat to the side-rear vehicle.

Referring to FIG. 14, after the lane change, the autonomous vehicle performs longitudinal control to maintain a time gap of 1.5 seconds, that is, a distance of 25 m based on a vehicle speed of 60 km/h, with respect to the side-front vehicle, and the side-rear vehicle performs longitudinal control to maintain a time gap of 1.8 seconds, that is, a distance of 30 m based on a vehicle speed of 60 km/h, with respect to the autonomous vehicle. The preceding vehicle and the side-front side are not affected at all by the lane change and speed change of the autonomous vehicle and the speed change of the side-rear vehicle and continue to travel at the set speed of 60 km/h.

FIG. 16 to FIG. 18 illustrate a driving result according to scenario 2 in FIG. 10.

FIG. 16 illustrates driving situations at 5 seconds, 12 seconds, 18 seconds, and 25 seconds, respectively. Although a lane change is requested at 10 seconds while the autonomous vehicle is following the preceding vehicle with a time gap of 1.5 seconds, the autonomous vehicle does not secure a safety distance to vehicles in a lane to move to and thus performs distance control (DC) and then a lane change. The side-rear vehicle is running at a distance of 50 m from the side-front vehicle until 10 seconds, and this distance corresponds to an interval greater than a time gap of 1.8 seconds of the side-rear vehicle, thus considering that the ACC constant distance control mode of the side-rear vehicle does not operate. The lane change may be performed when safety distances to both the side-front vehicle and the side-rear vehicle from the autonomous vehicle are secured. However, referring to FIG. 17, at 10 seconds, the safety distance to the side-rear vehicle is secured but the safety distance to the side-front vehicle is not secured. Accordingly, the autonomous vehicle performs distance control (DC) for about 3.5 seconds to secure the safety distance to the side-front vehicle and then performs a lane change (LC) for about 6.5 seconds.

In FIG. 18, the autonomous vehicle may decelerate to make a speed difference of up to 6 km/h with respect to the side-front vehicle in a distance control (DC) area. As in FIG. 17, due to the speed change of the autonomous vehicle, the side-front safety distance decreases, and the side-rear safety distance increases (in level). At 13.5 seconds after the 3.5-second distance control (DC), the autonomous vehicle secures both the side-front safety distance and the side-rear safety distance and accordingly starts the lane change (LC). The lane change is performed for about 6.5 seconds, in which the autonomous vehicle additionally decelerates to make a speed difference of up to 7 km/h with respect to the side-front vehicle for 2 seconds after starting the lane change, and then accelerates for 4.5 seconds to prepare for time gap control after the lane change.

Referring to FIG. 17, after the lane change, the autonomous vehicle performs longitudinal control to maintain a time gap of 1.5 seconds with respect to the side-front vehicle, and the side-rear vehicle performs longitudinal control to maintain a time gap of 1.8 seconds with respect to the autonomous vehicle. The preceding vehicle and the side-front side are not affected at all by the lane change and speed change of the autonomous vehicle and the speed change of the side-rear vehicle and may continue to travel at the set speed of 60 km/h.

Referring to graphs of FIG. 16 to FIG. 18, the autonomous vehicle does not cause a risk to adjacent vehicles and properly performs a lane change in the driving situations of scenario 2.

In scenario 2, unlike scenario 1, since the safety distance to the side-front vehicle is not satisfied, the autonomous vehicle does not immediately enter the LC mode, but enters the DC mode and then transitions to the LC mode when determining that the safety distance is sufficiently secured.

FIG. 19 to FIG. 21 illustrate a driving result according to scenario 3 in FIG. 11.

FIG. 19 illustrates driving situations at 5 seconds, 14 seconds, 23 seconds, and 32 seconds, respectively. Although a lane change is requested at 10 seconds while the autonomous vehicle is following the preceding vehicle with a time gap of 1.5 seconds, the autonomous vehicle does not secure a safety distance to vehicles in a lane to move to and thus performs distance control (DC) and then a lane change (LC). The side-rear vehicle is following the side-front vehicle at a previously set time gap of 1.5 seconds until 10 seconds.

Referring to FIG. 20, at 10 seconds, safety distances for a lane change to both the side-front vehicle and the side-rear vehicle are not secured. Accordingly, the autonomous vehicle performs distance control (DC) for about 11 seconds to secure a safety distance to the side-front vehicle and then performs a lane change (LC) for about 7 seconds.

In FIG. 21, the autonomous vehicle decelerates to make a speed difference of up to 17 km/h with respect to the side-front vehicle in a distance control (DC) area, and this speed difference is significantly greater than those in the previous two scenarios. To find the reason of the significantly great speed difference, the 11-second distance control (DC) area may be divided into two areas, an initial two-second area and a subsequent area. Deceleration of the autonomous vehicle for initial two seconds increases the relative speed to the side-front vehicle to about 10 km/h, thus securing the safety distance to the side-front vehicle (FIG. 20).

However, this deceleration worsens the safety distance to the side-rear vehicle, and thus the side-rear vehicle comes close just beside the autonomous vehicle. Accordingly, the autonomous vehicle may determine that it is impossible to change a lane in the space between the side-front vehicle and the side-rear vehicle as long as the side vehicles maintain current movements and may thus determine to change a lane after being positioned behind the side-rear vehicle. Accordingly, the autonomous vehicle additionally decelerates to make a speed difference of up to 17 km/h from the side vehicles, thus securing a safety distance behind the side-rear vehicle.

Referring to FIG. 20, the relative distance of the side-rear vehicle is changed from a negative value to a positive value at 14 seconds, which means that the side-rear vehicle passes the autonomous vehicle ahead. Accordingly, a reference for the safety distance is also changed from a rear safety distance to a front safety distance. In addition, referring to FIG. 21, the autonomous vehicle accelerates from about 15 seconds in the distance control (DC) area to reduce the speed difference from the side vehicles. This movement is appropriate because it is undesirable to have an excessive speed difference from a vehicle in the lane to move to in a situation where a lane change is subsequently performed. Accordingly, the autonomous vehicle enters a time gap following mode by gradually decelerating, that is, making only a speed difference of up to 2 km/h from the side vehicles, in a lane change (LC) area.

In FIG. 21, all three vehicles have the same relative speed, because these three vehicles drive at the same constant speed without being affected at all by the movement of the autonomous vehicle.

Referring to graphs of FIG. 19 to FIG. 21, the autonomous vehicle does not cause a risk to adjacent vehicles and properly performs a lane change in the driving situations of scenario 3, which is considerably difficult for the driver.

In scenario 3, unlike scenario 2, since the safety distances to the two side vehicles are not satisfied, the autonomous vehicle determines that it is impossible to change a lane in the space between the side vehicles and performs a lane change after being positioned behind the side-rear vehicle.

FIG. 22 to FIG. 24 illustrate a driving result according to scenario 4 in FIG. 12.

Although a lane change is requested at 10 seconds while the autonomous vehicle is following the preceding vehicle with a time gap of 1.5 seconds, the side-rear vehicle is approaching at a high speed to increase the risk level of a lane change of the autonomous vehicle, and thus the autonomous vehicle performs distance control and then a lane change. FIG. 22 illustrates driving situations at 5 seconds, 14 seconds, 21 seconds, and 28 seconds, respectively.

Referring to FIG. 23, for initial five seconds, the side-rear vehicle is positioned 80 m or more behind the autonomous vehicle, and thus a sensor of the autonomous vehicle does not recognize the side-rear vehicle. The side-rear vehicle is recognized from about 5 seconds, a rear safety distance is significantly long in view of the high vehicle speed of the side-rear vehicle compared to other scenarios, and a safety distance to the side-rear vehicle is not secured at 10 seconds at which the lane change is requested.

The autonomous vehicle determines that it is impossible to change a lane in the space between the side-front vehicle and the side-rear vehicle in view of the relative distances to the side-front vehicle and the side-rear vehicle and a safe area and thus performs distance control so that the autonomous vehicle is positioned behind the side-rear vehicle. The distance control (DC) is performed for about 7 seconds, and then a lane change (LC) is performed for about 6 seconds.

In FIG. 24, the autonomous vehicle decelerates with respect to the side-front vehicle in the distance control (DC) area to make a speed difference of up to 19 km/h, which is the greatest value among those in the four scenarios. Due to this deceleration, the relative distance of the side-rear vehicle rapidly decreases and then is changed to a positive value at about 12.5 seconds, which means that the autonomous vehicle is positioned behind the side-rear vehicle. As the side-rear vehicle is positioned in front of the autonomous vehicle, the original side-rear vehicle is switched to a side-front vehicle, which can be identified by a slightly discontinuous change in a front safety distance graph at 12.5 seconds in FIG. 23. The level of the discontinuous change is not significant because, as shown in FIG. 24, the difference in speed between the side-rear vehicle and the side-front vehicle at 12.5 seconds is about 4 km/h, which is not significant. In addition, in FIG. 23, the rear safety distance rapidly decreases after 10 seconds unlike in scenarios 2 and 3, because the degree to which the side-rear vehicle rapidly decelerates to maintain a certain distance from the side-front vehicle that becomes close during driving is much greater than the degree to which the autonomous vehicle decelerates to perform distance control for a lane change.

At the end of a distance control (DC) area, the relative distances of all vehicles are above the front safety distance, thus securing the safety distance. Accordingly, it is considered that a movement for securing the safety distance to the side vehicles is properly performed in scenario 4.

In a lane change (LC) area, the autonomous vehicle performs a lane change by reducing the speed difference from the side-rear vehicle traveling ahead of the autonomous vehicle. After completing the lane change, the autonomous vehicle is following the side-rear vehicle with a time gap of 1.5 seconds maintained.

Referring to graphs of FIG. 22 to FIG. 24, the autonomous vehicle according to an embodiment of the present disclosure does not cause a risk to adjacent vehicles and properly performs a lane change in the driving situations of scenario 4, which is unfavorable for a lane change and may cause a serious accident.

In scenario 4, unlike scenario 1, when the side-rear vehicle rapidly accelerates to approach with a significant speed difference from the autonomous vehicle, the autonomous vehicle determines that it is impossible to change a lane in the space between the side vehicles and performs a lane change after being positioned behind the side-rear vehicle.

FIG. 25 is a flowchart illustrating a method for controlling an autonomous vehicle according to an embodiment of the present disclosure.

Referring to FIG. 25, in operation 2510, a control apparatus of the autonomous vehicle may control the autonomous vehicle to travel on the basis of a distance from a preceding vehicle in a travel lane in which the autonomous vehicle travels or a preset speed.

In operation 2520, the control apparatus of the autonomous vehicle determine the risk level of a lane change on the basis of the speed of the autonomous vehicle, the speed of a side vehicle traveling in a target lane of a lane change, and the distance between the autonomous vehicle and the side vehicle upon occurrence of a lane change request. Here, the side vehicle may include a side-front vehicle and a side-rear vehicle travelling in the target lane of the lane change.

In an embodiment, the control apparatus of the autonomous vehicle may determine a first safety distance based on the side-front vehicle in proportion to the speed of the autonomous vehicle, may determine a second safety distance based on the side-rear vehicle in proportion to the speed of the side-rear vehicle, and may then determine the risk level of the lane change on the basis of the first safety distance and the second safety distance.

Here, the control apparatus of the autonomous vehicle may determine the first safety distance on the basis of the speed of the autonomous vehicle and a first result value of the speed of the autonomous vehicle minus the speed of the side-front vehicle. Further, the control apparatus of the autonomous vehicle may determine the second safety distance on the basis of the speed of the side-rear vehicle and a second result value of the speed of the side-rear vehicle minus the speed of the autonomous vehicle.

When determining the first and second safety distances, the control apparatus of the autonomous vehicle may determine the first safety distance and the second safety distance further on the basis of a first weight assigned to each of the speed of the autonomous vehicle and the speed of the side-rear vehicle and a second weight assigned to each of the first result value and the second result value. The first weight and the second weight may be preset on the basis of a change in the speed of the side-rear vehicle due to the lane change of the autonomous vehicle and a change in the speed of the autonomous vehicle due to deceleration of the side-front vehicle during the lane change of the autonomous vehicle.

Subsequently, the control apparatus of the autonomous vehicle may perform lateral or longitudinal control for the lane change on the basis of the risk level.

Specifically, when determining that the risk level indicates that there is a risk of the lane change in operation 2530, the control apparatus of the autonomous vehicle may perform longitudinal control of the autonomous vehicle so that the autonomous vehicle moves to a lane change-possible position in the travel lane in operation 2540.

Here, the control apparatus of the autonomous vehicle may determine the lane change-possible position so that the autonomous vehicle minimally moves in the travel lane according to conditions related to the distance between the autonomous vehicle and the side-front vehicle and the distance between the autonomous vehicle and the side-rear vehicle as constraint conditions. In this case, when a preceding vehicle is detected within the travel lane, the control apparatus of the autonomous vehicle may determine a position satisfying the constraint conditions in a rear range of the detected preceding vehicle as the lane change-possible position.

In operation 2550, the control apparatus of the autonomous vehicle may control the autonomous vehicle to change a lane.

When determining that the risk level indicates that there is no risk of the lane change in operation 2530, the control apparatus of the autonomous vehicle may go to operation 2550 and may control the autonomous vehicle to change a lane.

In an embodiment, the control apparatus of the autonomous vehicle may set a preceding vehicle or a side vehicle as a target vehicle and may control the autonomous vehicle on the basis of the target vehicle. Specifically, the control apparatus of the autonomous vehicle may calculate the target acceleration of the autonomous vehicle on the basis of a required control distance, which is a distance that the autonomous vehicle needs to move on the basis of the target vehicle, the distance between the target vehicle and the autonomous vehicle, the speed of the target vehicle, and the speed of the autonomous vehicle and may control the longitudinal speed of the autonomous vehicle on the basis of the target acceleration.

Here, the control apparatus of the autonomous vehicle may calculate the target acceleration of the autonomous vehicle on the basis of a first distance between the required control distance and the distance between the target vehicle and the autonomous vehicle and a second distance between the speed of the target vehicle and the speed of the autonomous vehicle. Here, the distance between the target vehicle and the autonomous vehicle and the required control distance may be differently set depending on a driving control mode of the autonomous vehicle.

In addition, in the LC mode in which the autonomous vehicle performs a lane change to the target lane, the control apparatus of the autonomous vehicle may set a virtual vehicle between the preceding vehicle and the side vehicle on the basis of the degree of approach to the target lane and may set the virtual vehicle as a target vehicle. In the lane change, the control apparatus of the autonomous vehicle may set the virtual vehicle between the preceding vehicle and the side vehicle as the target vehicle to perform delicate driving, thereby smoothly performing the lane change of the autonomous vehicle without a collision with an adjacent vehicle.

As used in the specification of the present disclosure (especially in the claims), the term "the" and similar references are to be construed to cover both a singular form and a plural form. Furthermore, recitation of a range herein is merely intended to cover a disclosure employing each separate value falling within the range, and (unless otherwise indicated herein) each separate value is incorporated into the specification as if it were individually recited herein.

Operations of a method according to the present disclosure may be performed in an appropriate order unless explicitly stated or otherwise. The present disclosure is not necessarily limited to the order in which the operations are stated. All examples or exemplary language (e.g., such as) used in the present disclosure is merely for the purpose of describing the present disclosure in detail, and the scope of the present disclosure is limited by these examples or illustrative terms unless defined by the claims. Those skilled in the art will appreciate that various modifications, changes, and combinations can be made according to design conditions and factors within the scope of the appended claims or equivalents thereof.

Accordingly, the spirit of the present disclosure should not be limited to the above-described embodiments, and not only the claims to be described below but also equivalents thereof or all ranges equivalently modified therefrom are construed as belonging to the scope of the spirit of the present disclosure.

What is claimed is:

1. An apparatus for controlling an autonomous vehicle, the apparatus comprising:
    a processor; and
    a memory configured to be operatively connected to the processor and to store at least one code performed at the processor,
    wherein the memory stores a code that, when executed by the processor, causes the processor to
    control the autonomous vehicle to travel on a basis of a distance from a preceding vehicle in a travel lane in which the autonomous vehicle travels or a preset speed,
    determine a risk level of a lane change on a basis of a speed (equation here)) of the autonomous vehicle, a speed of a side vehicle traveling in a target lane of a lane change, and a distance between the autonomous vehicle and the side vehicle upon occurrence of a lane change request, wherein the side vehicle comprises a side-front vehicle and a side-rear vehicle that travel in the target lane of the lane change,
    perform longitudinal or lateral control for the lane change on a basis of the risk level, and
    the memory stores a code that causes the processor to determine a first safety distance based on the side-front vehicle in proportion to the speed of the autonomous vehicle, determine a second safety distance based on the side-rear vehicle in proportion to a speed of the side-rear vehicle, and determine the risk level on a basis of the first safety distance and the second safety distance,
    wherein the determining of the second safety distance comprises
    determining the first safety distance and the second safety distance on the basis of a first weight assigned to each of the speed of the autonomous vehicle and the speed of the side-rear vehicle and a second weight assigned to each of the first result value and the second result value, and
    the first weight and the second weight are preset on the basis of a change in the speed of the side-rear vehicle due to the lane change of the autonomous vehicle and a change in the speed of the autonomous vehicle due to deceleration of the side-front vehicle during the lane change of the autonomous vehicle; and
    wherein the setting of the preceding vehicle or the side vehicle as the target vehicle comprises
    setting a virtual vehicle between the preceding vehicle and the side vehicle on the basis of a degree of approach to the target lane and
    setting the virtual vehicle as the target vehicle in an LC mode in which the autonomous vehicle performs the lane change to the target lane.

2. The apparatus of claim 1,
    set the preceding vehicle or the side vehicle as the target vehicle, calculate a target acceleration of the autonomous vehicle on a basis of a required control distance (), which is a distance that the autonomous vehicle moves on the basis of the target vehicle, a distance () between the target vehicle and the autonomous vehicle, a speed () of the target vehicle, and the speed () of the autonomous vehicle, and control a longitudinal speed of the autonomous vehicle on the basis of the target acceleration.

3. The apparatus of claim 1, wherein the memory stores a code that causes the processor to calculate the target acceleration of the autonomous vehicle on the basis of a first distance between the required control distance ($C_d$) and the distance ($c_{target}$) between the target vehicle and the autonomous vehicle and a second distance between the speed ($v_{target}$) of the target vehicle and the speed ($v_i$) of the autonomous vehicle, and
    the distance ($c_{target}$) between the target vehicle and the autonomous vehicle and the required control distance ($C_d$) are differently set depending on a driving control mode of the autonomous vehicle.

4. The apparatus of claim 2,
    wherein the memory stores a code that, when executed by the processor, causes the processor to operate in any one of i) an adaptive cruise control (ACC) mode of performing longitudinal or lateral control of the autonomous vehicle on the basis of a distance from a preceding vehicle in a travel lane in which the autonomous vehicle travels or a preset speed, ii) the lane change (LC) mode of determining a risk level of a lane change on the basis of information about the autonomous vehicle and information about a side vehicle traveling in a target lane of a lane change upon occurrence of a lane change request and performing longitudinal or lateral control for the lane change on the basis of the risk level, or iii) a distant control (DC) mode of performing longitudinal control of the autonomous vehicle so that the autonomous vehicle moves to a lane change-possible position in the travel lane on the basis of the risk level upon occurrence of a lane change request.

5. The apparatus of claim 1, wherein, when it is determined that the risk level indicates that there is a risk of the lane change, the memory stores a code that causes the processor to perform longitudinal control of the autonomous vehicle so that the autonomous vehicle moves to a lane change-possible position in the travel lane.

6. The apparatus of claim 1, wherein the side vehicle comprises a side-front vehicle and a side-rear vehicle that travel in the target lane of the lane change, and the memory stores a code that causes the processor to determine the lane change-possible position so that the autonomous vehicle minimally moves in the travel lane according to conditions related to a distance between the autonomous vehicle and the side-front vehicle and a distance between the autonomous vehicle and the side-rear vehicle as constraint conditions, and determine a position satisfying the constraint conditions in a rear range of a detected preceding vehicle as the lane change-possible position when the preceding vehicle is detected within the travel lane.

7. A method for controlling an autonomous vehicle, the method comprising:

controlling, by a processor, the autonomous vehicle to travel on a basis of a distance from a preceding vehicle in a travel lane in which the autonomous vehicle travels or a preset speed;

determining, by the processor, a risk level of a lane change on a basis of a speed () of the autonomous vehicle, a speed of a side vehicle traveling in a target lane of a lane change, and a distance between the autonomous vehicle and the side vehicle upon occurrence of a lane change request; and performing, by the processor, longitudinal or lateral control for the lane change on a basis of the risk level, wherein the side vehicle comprises a side-front vehicle and a side-rear vehicle that travel in the target lane of the lane change, and the determining, by the processor, of the risk level of the lane change comprises determining a first safety distance based on the side-front vehicle in proportion to the speed of the autonomous vehicle and a second safety distance based on the side-rear vehicle in proportion to a speed of the side-rear vehicle, and determining the risk level on a basis of the first safety distance and the second safety distance;

wherein the determining of the second safety distance comprises determining the first safety distance and the second safety distance on the basis of a first weight assigned to each of the speed of the autonomous vehicle and the speed of the side-rear vehicle and a second weight assigned to each of the first result value and the second result value, and the first weight and the second weight are preset on the basis of a change in the speed of the side-read vehicle due to the lane change of the autonomous vehicle and a change in the speed of the autonomous vehicle due to deceleration of the side-front vehicle during the lane change of the autonomous vehicle, wherein the setting of the preceding vehicle or the side vehicle as the target vehicle comprises:

setting a virtual vehicle between the preceding vehicle and the side vehicle on the basis of a degree of approach to the target line; and setting the virtual vehicle as the target vehicle in an LC in which the autonomous vehicle performs the lane change to the target lane.

8. The method of claim 7, further comprising:

determining, by the processor, the preceding vehicle or the side vehicle as a target vehicle;

determining, by the processor, a target acceleration of the autonomous vehicle on a basis of a required control distance, which is a distance that the autonomous vehicle moves on a basis of the target vehicle, a distance between the target vehicle and the autonomous vehicle, a speed of the target vehicle, and the speed of the autonomous vehicle; and controlling, by the processor, a longitudinal speed of the autonomous vehicle on the basis of the target acceleration.

9. The method of claim 7, wherein the determining of the target acceleration of the autonomous vehicle comprises calculating, by the processor, the target acceleration of the autonomous vehicle on a basis of a first distance between the required control distance and the distance between the target vehicle and the autonomous vehicle and a second distance between the speed of the target vehicle and the speed of the autonomous vehicle, and the distance between the target vehicle and the autonomous vehicle and the required control distance are differently set depending on a driving control mode of the autonomous vehicle.

10. The method of claim 7, wherein, when it is determined that the risk level indicates that there is a risk of the lane change, the performing of the longitudinal or lateral control comprises performing longitudinal control of the autonomous vehicle so that the autonomous vehicle moves to a lane change-possible position in the travel lane.

11. The method of claim 7, wherein the side vehicle comprises a side-front vehicle and a side-rear vehicle that travel in the target lane of the lane change, and the performing, by the processor, of the longitudinal control of the autonomous vehicle so that the autonomous vehicle moves to the lane change-possible position comprises determining the lane change-possible position so that the autonomous vehicle minimally moves in the travel lane according to conditions related to a distance between the autonomous vehicle and the side-front vehicle and a distance between the autonomous vehicle and the side-rear vehicle as constraint conditions, and determining a position satisfying the constraint conditions in a rear range of a detected preceding vehicle as the lane change-possible position when the preceding vehicle is detected within the travel lane.

* * * * *